United States Patent [19]

Kuseski

[11] 4,317,629

[45] Mar. 2, 1982

[54] JOB RECOVERY METHOD AND SYSTEM

[75] Inventor: Roger E. Kuseski, Longmont, Colo.

[73] Assignee: International Business Machines Corporation, Armonk, N.Y.

[21] Appl. No.: 118,361

[22] Filed: Feb. 4, 1980

[51] Int. Cl.[3] .................... G03B 27/32; G03B 27/52; G06F 1/00

[52] U.S. Cl. .................................. 355/24; 235/92 SB; 355/14 CU; 364/900

[58] Field of Search .............. 355/14 R, 14 C, 14 CU, 355/14 SH, 24, 50; 364/900, 200 MS File, 900 MS File; 235/151.22, 92 SB; 340/324 B; 360/15, 16

[56] References Cited

U.S. PATENT DOCUMENTS

| | | | |
|---|---|---|---|
| 3,588,472 | 6/1971 | Glaster et al. | 235/92 |
| 3,682,544 | 8/1972 | Glaser | 355/14 |
| 3,944,794 | 3/1976 | Reehil et al. | 235/92 SB |
| 4,086,658 | 4/1978 | Finlay | 364/900 |
| 4,099,254 | 7/1978 | Andrews et al. | 355/24 X |
| 4,130,354 | 12/1978 | Steiner | 355/26 |
| 4,163,897 | 8/1979 | Hubbard et al. | 355/14 CU |
| 4,206,996 | 6/1980 | Clark et al. | 355/14 |

*Primary Examiner*—Richard A. Wintercorn

*Attorney, Agent, or Firm*—Carl M. Wright; Robert E. Harris

[57] ABSTRACT

Job recovery method and system for generating complete sets of copies and providing billing information with respect thereto. Job recovery is automatically effected after a jam occurs with respect to copy sheets by maintaining counts of sheets reaching the exit pocket and retained in the duplex tray for determining therefrom images lost due to the jam and responsive thereto generating replacement copies. Counts are also maintained for determining when copying of each set is complete and for billing purposes with the count for billing purposes reflecting only delivered copies with no additions being made for replacement copies generated due to lost images. For effecting job recovery due to jams occurring during imaging of duplex copies, replacement sheets are generated immediately after each jam to replace those sheets lost due to the jam by determining the number of pages to be printed, dividing this number by two, and subtracting therefrom the count of sheets in the duplex tray and in the exit pocket, with this determination being then used to control generation of first side images on sheets needed for replacement purposes with said sheets being then conveyed to the duplex tray so that the resulting duplex copy generation is complete when reaching the exit pocket.

20 Claims, 18 Drawing Figures

FIG. 4
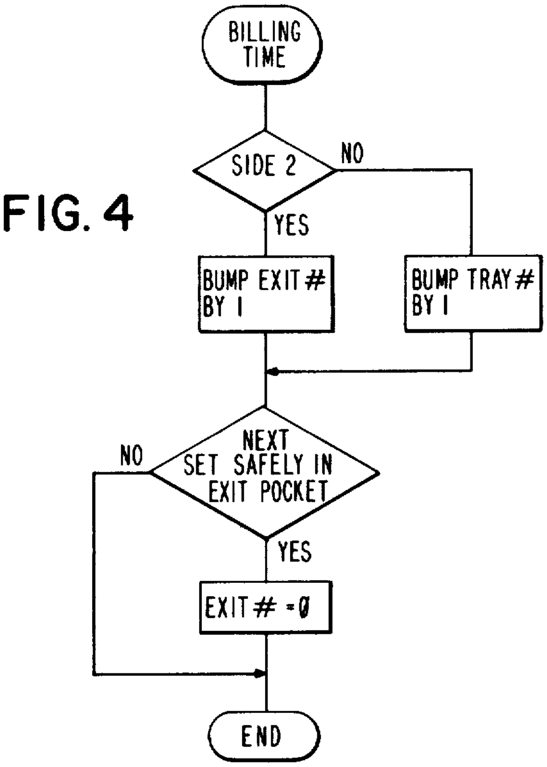
FIG. 2
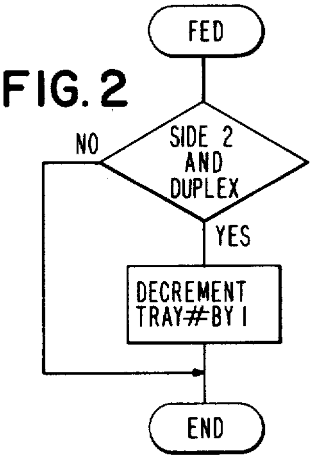
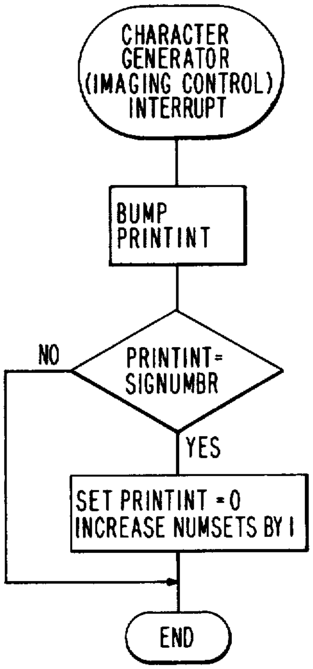
FIG. 3

JOB RECOVERY METHOD AND SYSTEM

This invention relates to a job recovery method and system and particularly, relates to a job recovery method and system for automatic replacement of copies lost due to jams occurring during printing, updated billing information being provided in conjunction therewith.

BACKGROUND OF THE INVENTION

Copying of material is well known and many diverse systems and/or methods have heretofore been suggested and/or utilized to achieve the desired end. One such system is an electrical-signal-driven printer wherein signals representative of the visual images on each page to be printed are supplied to the printer in numerical page order. If only one side of a recording medium (such as a paper copy sheet, for example) is to have an image printed thereon, each signal may be used when received to print the visual image on sheets as fed through the printer. When multiple copies are desired, however, the electrical signals must be inserted, when received, in some form of a recirculating delay line and the delay line recycled as needed to print the number of copies desired.

For simplex copies (i.e., copies having an image on one side only), each electrical signal representative of a page to be imaged is brought to a copying, or printing, area where the image is formed on the sheet and the sheet then discharged from the printer.

For duplex copies, i.e., copies having an image on both sides of the copy sheet, different electrical signals representative of each page must be brought at different times to the printing area and the copy sheet must be brought to the printing area with one side exposed for printing during a first pass and the opposite side exposed for printing during a subsequent second pass. Obviously, this becomes complicated since it is often desired that each page of the sequence appear in order so that each even numbered page appears on the back side of each odd numbered page, as in a book, for example. In addition, further complications are introduced when multiple copies of each page are to be printed.

An example of a system and method for effecting printing of copies by sets is shown in U.S. Pat. No. 4,099,254. While the device shown in this patent solves many of the problems heretofore associated with copy generation, it does not provide for job recovery, i.e., recovery from jams occurring with respect to copy sheets, or errors introduced due to double, or lack of, feed of copy sheets.

Job recovery has been heretofore suggested and/or utilized with respect to copying devices, including those capable of printing multiple copies and/or effecting duplex copying. Such job recovery, however, has not been completely satisfactory, at least for all instances, and particularly with respect to recovery from jams occurring during second side copying of multiple duplex copies.

Prior art suggestions have included devices with counters and the like for counting documents and/or copy sheets to effect both simplex and duplex copying. However, such devices have not proven to be completely satisfactory and/or capable for use in job recovery for automatic recovery from jams occurring with respect to generation of multiple copies and/or jam recovery during second side copying.

In addition, heretofore known copying devices and/or methods have not proven to be completely satisfactory for generation of complete sets of copies when double or lack of copy sheet feeding has occurred, or when interruption of copying has occurred. In addition, while providing for copy counts, such devices and/or methods have not adequately provided for counts of copies generated without including in such counts any copies generated for replacement purposes.

SUMMARY OF THE INVENTION

This invention provides an improved method and system for generating complete sets of copies including generation of replacement copies due to jams or other like occurrences. This invention also provides counts of copies generated, which counts do not include replacement copies generated.

It is therefore an object of this invention to provide an improved method and system for generating complete sets of copies.

It is another object of this invention to provide an improved method and system for generating complete sets of copies including generation of replacement copies due to jams and the like.

It is another object of this invention to provide an improved job recovery method and system.

It is still another object of this invention to provide an improved job recovery method and system for generating copies to replace copies lost due to jams occurring with respect to copy sheets.

It is still another object of this invention to provide an improved job recovery method and system that is particularly well suited for recovery from jams occurring during printing of second sides of duplex copy sheets.

It is still another object of this invention to provide an improved method and system for generating complete sets of copies despite double or lack of feed of copy sheets to a printing area and/or interruption of the printing process.

It is still another object of this invention to provide an improved method and system for generating complete sets of copies with accurate counts thereof being provided for billing purposes.

It is still another object of this invention to provide an improved method and system for providing an accurate count of copies generated without inclusion of replacement copies generated due to job recovery.

BRIEF DESCRIPTION OF THE DRAWINGS

The above mentioned and other features and objects of this invention and the manner of attaining them will become more apparent and the invention itself will best be understood by reference to the following description of the embodiment of the invention taken in conjunction with the accompanying drawing, the description of which follows.

FIGS. 2 through 4 are flow charts depicting illustrative operation of register set up due to flow of copy sheets through the printer as illustrated in FIG. 1;

DESCRIPTION OF THE PREFERRED EMBODIMENT

Figure 1:
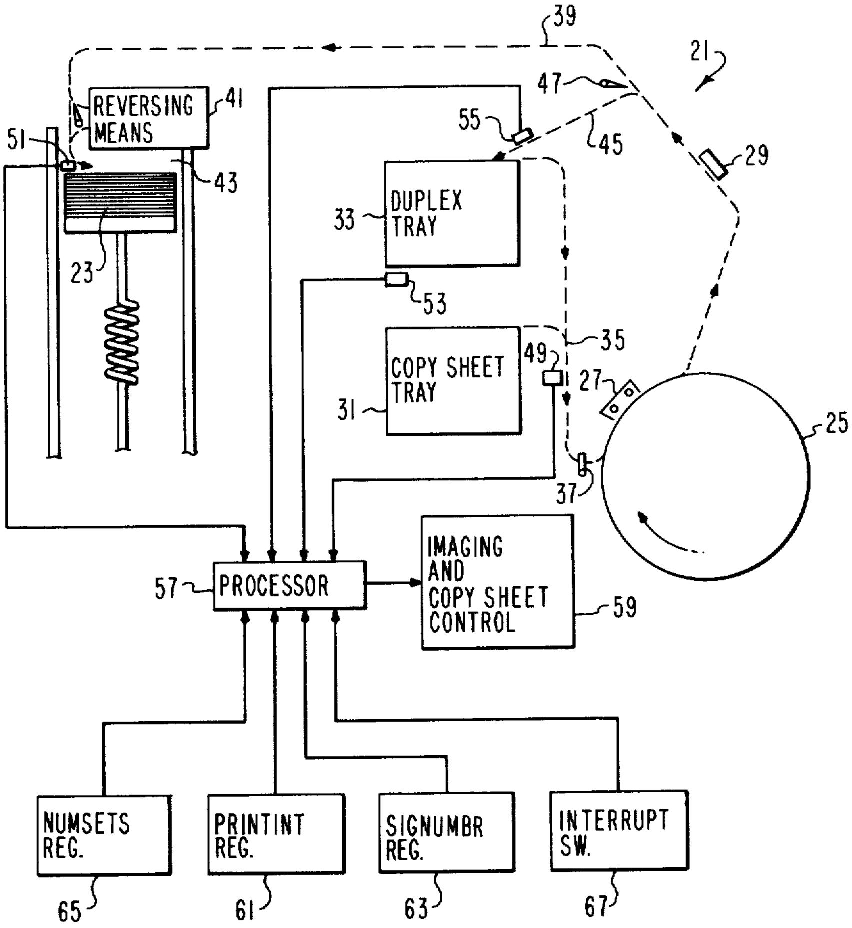
FIG. 1 is a schematic and block illustration of the sheet feed path in a printer having job recovery as a part thereof.

The invention is illustrated in FIG. 1 in conjunction with a printer 21. Printer 21 may be a printer as shown and disclosed in U.S. Pat. No. 4,099,254, which is hereby incorporated by reference herein.

As is known and as shown in U.S. Pat. No. 4,099,254, printer 21 may be utilized to form an image (normally visual although nonvisual images could also be formed) on a recording medium (such as discrete paper sheets, although a continuous web surface could also be utilized). The image is formed in response to an electrical signal representative of the image when the electrical signal representation is presented at a copying, or printing, area. The recording media (hereafter referred to as copy sheets) are transported to the copying area one by one so that the image is formed thereon in the manner as described in U.S. Pat. No. 4,099,254 and such a printer is described hereinafter in conjunction with copy sheet transfer and with respect to the invention only to the extent deemed necessary to understand the invention utilized in conjunction therewith.

As shown in FIG. 1, blank copy sheets from copy sheets tray 31 are transported to rotating xerographic drum 25 which has thereon the image to be printed. To effect imaging, copy sheets are fed past transfer station 27 where the images are transferred onto one side of the sheet at the copying, or printing, area. Each sheet printed at transfer station 27 is then transfered along a copy sheet path through fixing, or fusing, station 29.

Copy sheets with no printing on either side are initially withdrawn from copy sheet storage tray 31, whereas copy sheets printed on one side are withdrawn from duplex tray 33. In each case, the withdrawn copy sheet is fed along a copy sheet path 35 through a synchronizing gate 37 prior to being conveyed to transfer station 27 so that each sheet is fed to the transfer station in synchronism with the movement of the image on drum 25.

After the image has been fixed on the copy sheet, it is then transported along one of two paths. If the copy sheet is transported along copy sheet path 39 (where it can be reversed by reversing means 41), it ultimately is deposited in exit pocket 43 as finished copy sheets 23. If, however, the copy sheet is transported along copy sheet path 45, it is ultimately deposited in duplex tray 33. The path of the copy sheet is controlled by diversion vane 47.

As shown in FIG. 1, a FED sensor 49 is provided along path 35 to effect a count of all copy sheets (both from copy sheet storage 31 and duplex tray 33) fed to the copying area, i.e., fed on drum 25 to transfer station 27. In addition, an EXIT sensor 51 is provided at exit pocket 43 to effect a count of copy sheets discharged from the copy area along path 39 (and hence effectively discharged from the printer), and a TRAY sensor 53 is provided at duplex tray 33 to sense the presence of any copy sheet discharged in the duplex tray. Sensor 53 indicates either that the duplex tray has at least one copy therein, i.e., is not empty or that the duplex tray is empty. An additional sensor 55 is provided along path 45 to effect a count of all copy sheets fed into the duplex tray 33.

In conjunction with each of the sensors (i.e., sensors 49, 51, 53 and 55) a corresponding counter is provided to a processor 57, which processor may be a microprocessor which includes processing for the entire operation of the printer and which controls imaging and copy sheets control unit 59 as indicated in FIG. 1 (all of which may be as shown and described in U.S. Pat. No. 4,099,254).

The added function of processor 57 (over that shown and described in U.S. Pat. No. 4,099,254) is for job recovery as described hereinafter. To effect job recovery, processor 57 also receives information as to the total number of prints imaged for the set then being printed from PRINTINT register 61, information as to the total number of pages for the set from SIGNUMBR register 63, and information as to the number of sets then made for a particular job from NUMSETS register 65. In addition, processor 57 is also connected to an interrupt switch 67 for effecting interruption of copying as desired by an operator.

For printing duplex copies, printer 21 operates generally by writing one page of data at a time in alternating memory files so that page 1 is written on a first file (file 1), page 2 is written on a second file (file 0), page 3 is then written on file 1 immediately next to page 1, and so forth until all pages are written.

The data are then read back for duplex copy printing purposes by reading the entire first file (file 1) before reading the second file (file 0). For reading of the first file, all of the pointers of the first file are reversed so that the last page (page 9, for example) is read first followed by each immediately adjacent page (pages 7, 5, 3 and then 1, for example) with each copy sheet imaged for the odd numbered pages of file 1, i.e., copy sheets having an image on one side thereof, being transferred to duplex tray 33. In this manner, page 9 is stored at the bottom of duplex tray 33 with pages 7, 5, 3 and then 1 being stacked thereabove.

After file 1 is read, then file 0 is read in regular, or normal, order as written, e.g., pages 2, 4, 6, 8 and then 10, with each of the even numbered pages being printed on copy sheets withdrawn from duplex tray 33. Each copy sheet is turned over at duplex tray 33 (which is preferably a LIFO interim storage). Thus, the copy sheet with page 1 printed on one side is first presented to the printing area (when withdrawn from duplex tray 33) so that page 2 is printed on the opposite side thereof. In this manner, each copy sheet is imaged on the opposite side and the copy sheets twice exposed at the printing area are the conveyed to exit pocket, or station, 43 where a complete set is collected with each copy sheet having an odd numbered page on one side and the immediately following even number page on the opposite side, i.e, the first copy sheet has page 1 on one side and page 2 on the opposite side, the second copy sheet has page 3 on one side and page 4 on the other side, etc. Page 1 is face down so the set is already collated.

For job recovery for the first set of copies and for the first side of multiple sets, recovery can be effected by simply reprinting the copies lost. Thus, if two copies are lost due to a jam, two replacement copies are generated after clearing the jam, and the printing job can proceed in the normal manner. For job recovery due to lost copies occurring during second side copying of multiple sets of copies, the number of lost copies must first be determined and then replacement copies must be generated with each replacement requiring printing of the first side of each copy sheet before copy generation can be continued in normal fashion with respect to second side printing.

In this invention, it is not necessary to require the entire set to be remade when a jam occurs during second side printing of duplex copies. Instead, a first count is maintained of the total number of pages fed to the printing area (by FED sensor 49) for determining when each set to be copied is complete and the next set started; a second count is maintained of the number of copy sheets then in the duplex tray (TRAY number register 55); and a third count is maintained of the number of copy sheets reaching the exit pocket (EXIT number register 51).

When a jam occurs during side one copying, replacement sheets are generated after the jam is cleared and normal copy generation is continued. When a jam occurs during side two copying of multiple sets, however, a determination is made of sheets lost in the jam by subtracting the count of sheets in the tray register 55 and in the exit register 51 from one-half the total number of pages in the set, then the first side of pages determined to have been lost are recopied, and those replacement pages placed in the duplex tray, after which the normal printing operation is continued except that those pages that made it to the exit pocket before occurrence of the jam are not reprinted.

Thus, the number of pages lost in a jam (R) is determined by the formula:

$$R = TP/2 - C_T - C_E$$

where TP equals total number of pages in the set to be printed, $C_T$ equals the count in the duplex TRAY number register, and $C_E$ equals the count in the EXIT number register.

Assuming, by way of example, that 10 pages are in the set, that one copy sheet (having pages 1 and 2 printed thereon) has reached the exit pocket (so that EXIT number register equals 1), and that a copy sheet with page 9 printed on one side thereof is in the duplex tray (so that TRAY number register equals 1), then according to the formula set forth hereinabove R=10/2-1-1=3.

Thus, the three copy sheets which should have had pages 3 through 8 printed thereon have been included in the jam (since pages 1 and 2 are printed on the one sheet in the exit pocket and page 9 is on the one sheet in the duplex tray).

The imaging control unit is then recycled to cause the electrical signals indictative of the pages on file 1 (odd numbered pages) to be presented at the copying area and new, or replacement, copies are printed for pages 7, 5 and 3. These pages are then placed in the duplex tray and the electrical signals indicative of the pages of file 0 (the even number pages) are then again presented to the copying area for reprinting of pages 4, 6 and 8 on the copy sheets withdrawn from the duplex tray, after which normal operation is continued by withdrawing page 9 from the duplex tray and printing page 10 on the reverse side of that copy sheet.

As can be appreciated from the foregoing, replacement sheets generated to replace copies lost travel the same path as copy sheets normally utilized in the printing process. Since duplex tray switch 55 and exit switch 51 are utilized to maintain a count of copy images made (switch 55 counts side one images on copy sheets stored in the duplex tray and switch 51 counts side two images on copy sheets reaching the exit pocket), provision must be made to preclude such a count including such replacement sheets since generation of each sheet requires remaking side one images. In other words, rebilling, or double billing, must be precluded.

In addition, double sheets feeds can occur both into and out of the duplex tray. Double feed is corrected by remaking the entire set. Hence, here again, rebilling for pages serving as replacement copies must be precluded. Likewise, precluding a billing for blank pages must be effected for accurate billing information.

Control of processing for achieving the above mentioned ends can be effected by means of a software program for the processor, which processor is preferably a microprocessor, and may be of the type shown, for example, in U.S. Pat. No. 4,086,658.

The program for effecting the foregoing is a part of this specification. The flow charts of FIGS. 2 through 18 explain the attached program. In these flow charts, definitions of the terms utilized are as follows:

FED—sheet (print) is fed from paper supply into paper path—supply is either primary, alternate, or duplex tray;

SIDE 2—in duplex mode feeding paper from the duplex tray;

TRAY #—number of sheets in duplex tray;

PRINTINT—number of prints imaged for this set;

SIGNUMBR—number of pages per set;

NUMSETS—number of sets made to this point in time;

EXIT#—number of sheets in exit tray for this set;

SKIP1ST#—number of pages to skip before beginning to print when doing error recovery.

REMAKE#—number of pages to remake after skipping SKIP1ST# value.

SKIP2ND#-number of pages to skip after remaking REMAKE# value.

The flow charts of FIGS. 2 through 4 illustrate the effect of movement of copying paper depending upon the path of such paper to achieve duplex printing. In FIG. 2, it is shown that the decision made with respect to the copy sheet path (depending upon whether copying is on side 2 and duplex) causes the TRAY number register to be decremented by one when SIDE 2 and duplex copying is being carried out. This is carried out in the Appendix B, addresses 7FD6-7FDE, and is necessary to maintain the proper count in the TRAY number register to enable job recovery as described above.

In FIG. 3, it is shown that the PRINTINT register is incremented (see Appendix B, addresses A8CB-A8CD) as the print is made by interrupting the character generator (in the imaging unit of the printer) and a check is then made to determine whether PRINTINT equals SIGNUMBR (set complete) and, if so, PRINTINT is reset to zero and NUMSETS is increased by one (see Appendix B, addresses A8EA-A912 and A925-A938) to thus bump the set count.

In FIG. 4, it is shown that with respect to billing time, a determination is made as to whether SIDE 2 is being printed, i.e., did the sheet just billed go into the exit pocket? If so, the EXIT number register is increased by one, and, if not, then the TRAY number register is increased by one (Appendix B, addresses AC47-AC54). In either case, when the entire set is indicated to be in the exit pocket, then the EXIT number register is reset to zero (Appendix B, addresses AC55-AC80).

Figure 5:
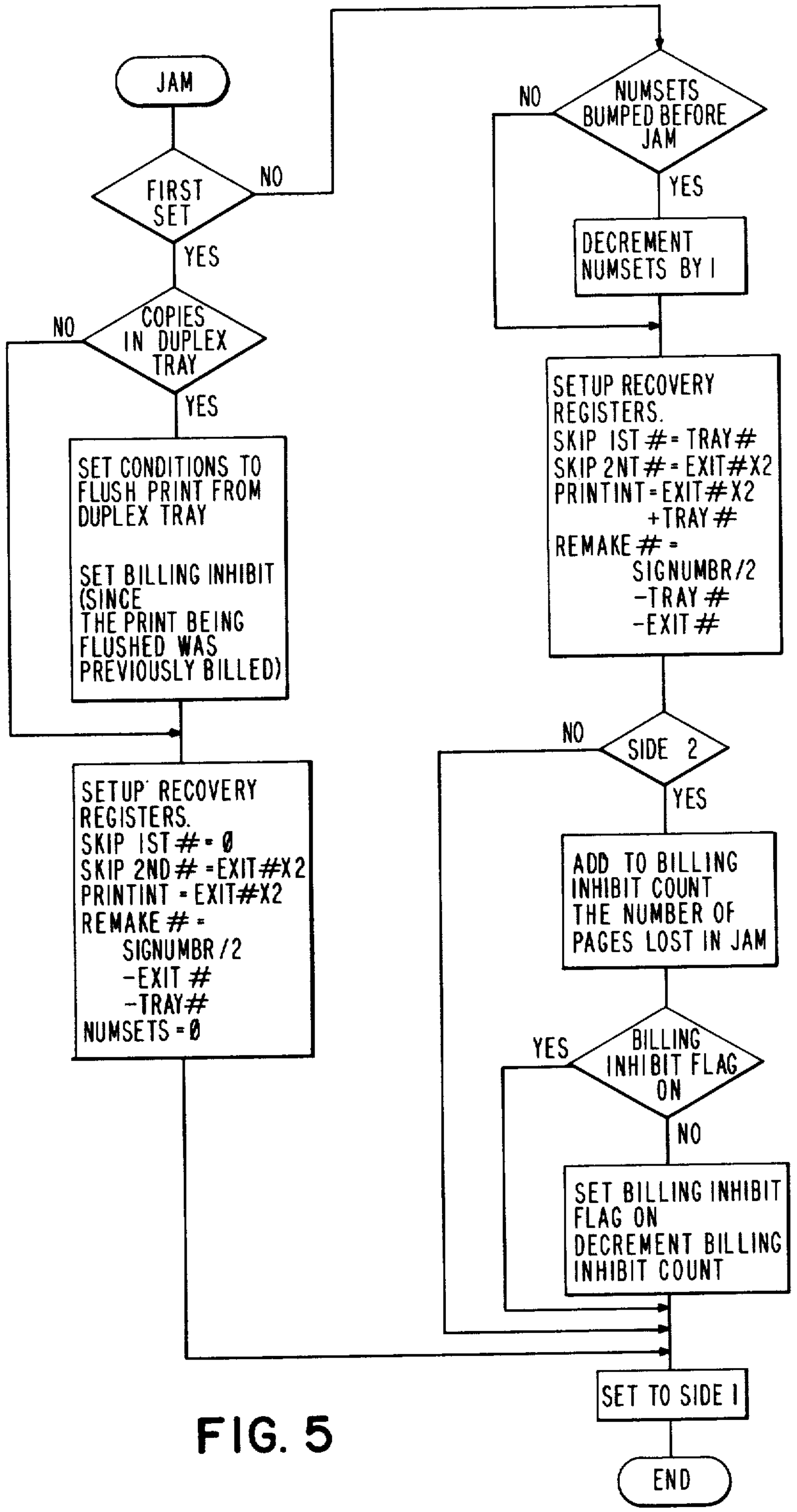
FIG. 5 is a flow chart depicting illustrative operation for effecting set up for error recovery in the printer illustrated in FIG. 1.

With respect to the set up for job recovery due to a jam, this is shown by the flow chart of FIG. 5. As shown, a jam (Appendix B, address A03A) requires that a determination be made whether a first set is being copied (Appendix B, addresses BBF6-BBFB) since, for the first set, the pages go into and out of the duplex tray one at a time. If a first set is being copied, and there are copies in the duplex tray (Appendix B, addresses BC00-BC17), then a condition is set to flush that print from the duplex tray and the billing inhibit is set since the print being flushed was previously billed. After the duplex tray is empty, the recovery registers are set up as shown in FIG. 5 (Appendix B, addresses BC19-BC20 with remake number at Appendix B, addresses 9CBF-9CD6).

If not a first set, then all sheets with only side 1 imaged thereon are moved into the duplex tray and all side 2 images are made by withdrawing these sheets from the duplex tray. To set up for this, it is determined whether the NUMSETS register was bumped before the jam and, if so, this register is decremented by one (Appendix B, addresses BC3E-BC45). The registers are then set up as shown in FIG. 5 (Appendix B, address BC48 with remake at Appendix B, addresses 9CBF-9CD6).

If side 2 copying is being carried out, then the billing inhibit register is increased by the number of pages lost in the jam (Appendix B, addresses BC55-BC5D), and it is determined whether the billing inhibit flag in the printer is set (Appendix B, addresses BC5E-BC68) and, if not, it is set and the billing inhibit count is decremented by one. Set up is then completed by setting the printer for side one copying.

Figure 6:
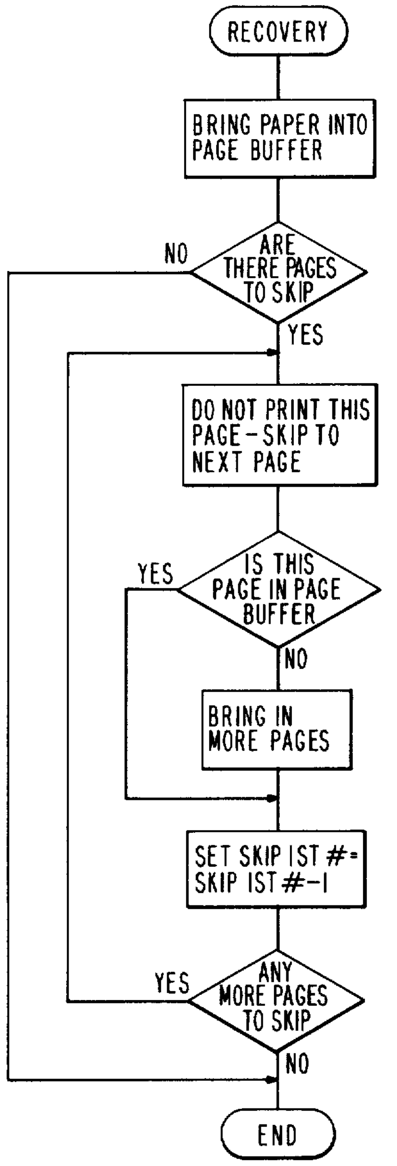
FIGS. 6 and 7 are flow charts depicting illustrative operation for effecting error recovery in the printer illustrated in FIG. 1.
Figure 7:
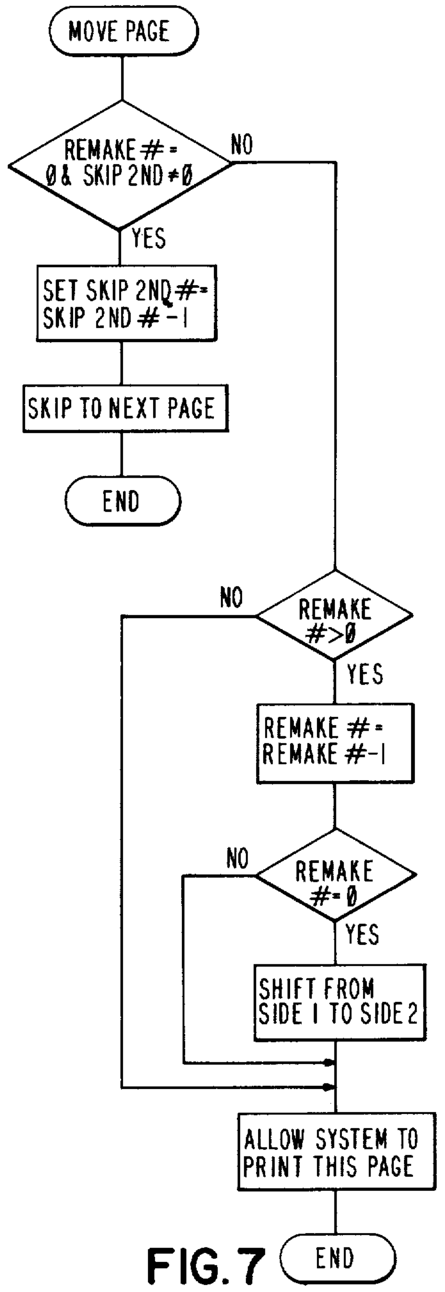

Error, or jam, recovery is shown by the flow charts of FIGS. 6 and 7. With respect to jams occurring during first set copying, all data for the job is spooled to a disk memory before error recovery begins.

As shown in FIG. 6, to effect recovery, the pages are brought into the page buffer (Appendix B, addresses 9D0A-9D23). It is then determined whether pages are to be skipped (Appendix B, addresses 9D29-9D30) and, if so, the page is then skipped (Appendix B, addresses 9D40-9D4B). This effects skipping of pages that have been determined by the TRAY number register to be already present in the duplex tray. It is then determined whether the next page is in the page buffer (Appendix B, addresses 9D4D-9D51) and, if not, more pages are brought in (Appendix B, addresses 9D53-9D6A) and the SKIP1ST# register is decremented by one (Appendix B, addresses 9D6B-9D6D). It is then determined whether there are any more pages to skip and, if so, skipping of pages is repeated (Appendix B, addresses 9D6E). When all pages to be skipped have been skipped, the first page is in the page buffer that needs to be printed to effect job recovery.

As shown in FIG. 7, when there is a page in the page buffer that is apparently ready to print to effect job recovery, a determination is made as to whether the REMAKE number equals zero and the SKIP2ND number is not equal to zero (indicating that there is a page to be skipped due to duplex error since the page is already in the exit pocket) (Appendix B, addresses 9E35-9E41 and 9E21-9E34). If so, then the SKIP2ND number register is decremented by one and the page buffer is skipped to the next page. If not, then a determination is made whether the REMAKE number is greater than zero (Appendix B, addresses 9E35-9E39). If the REMAKE number is greater than zero, then it is decremented by one (Appendix B, addresses 9E45-9E47), and if it then equals zero, a special side change control is effected to change from side one to side two after this page is placed in the duplex tray (Appendix B, addresses 9E48-9E4E). As can be appreciated from FIG. 7, the only condition a page is not printed is if REMAKE#=0 and SKIP2ND≠0. After the page is printed, the order will be entered again until all pages to be skipped are skipped and all pages to be printed have been printed.

When printing of a set of copies is interrupted, it is desired that the job be later continued to complete the job from the same point as where interrupted. In this invention, a copy interrupt sets up the recover registers so that the background print job will continue from the point of interruption when the copy job is complete.

Figure 8:
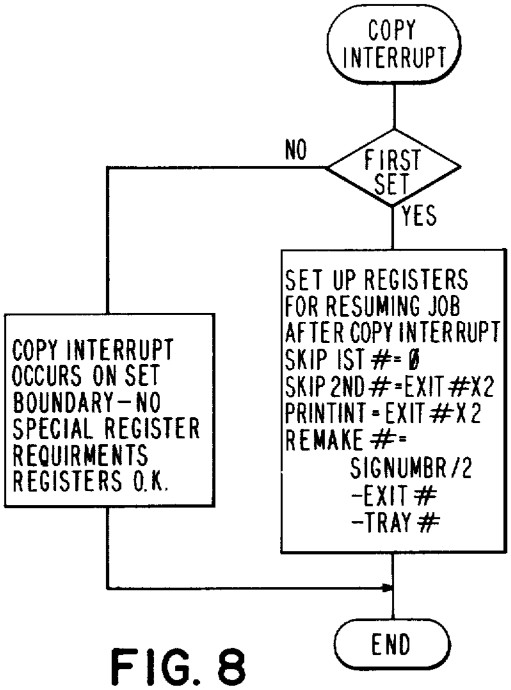
FIG. 8 is a flow chart depicting illustrative operation for handling copy interruptions in the printer illustrated in FIG. 1.

As shown in FIG. 8, when a copy interrupt occurs, it is determined whether a first set is being printed, and, if so, the registers are set up as shown in FIG. 8 (Appendix B, addresses B64B-B673). If not, copy interrupt is activated on a set boundary so that there is no special recovery requirements, i.e., the registers are correct. A copy interrupt can occur on other than a set boundary for second and subsequent printing sets, but only if a jam occurs or is in progress when a copy interrupt is initiated. If so, jam recovery takes over and sets up the registers appropriately.

Special error recovery for double feeds is shown by the flow charts of FIGS. 9 through 12. A double feed may occur at any time either on prints going into the duplex tray or coming out of the duplex tray. A double feed is detected when either printing out of the duplex tray and the duplex tray becomes empty before completing that set (double feed occurred out of duplex tray) or, upon completing the set, there are still sheets in the duplex tray (double feed occurring going into the duplex tray). A double feed causes a deficient set of copies to be generated and the point of deficiency can not be determined since it can be anywhere in the set. This means that the entire set needs to be remade.

Figure 9:
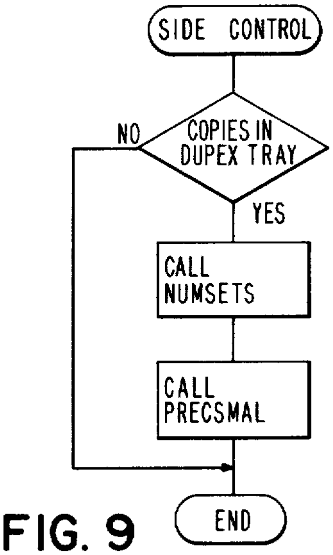
FIGS. 9 through 12 are flow charts depicting illustrative operation for handling double feed in the printer illustrated in FIG. 1.

As shown in FIG. 9, it is determined whether there are copies in the duplex tray and, if so, routines NUMSETS and PRECSMAL are called to indicate that, even though the set number was bumped, it is going to be remade and therefore must be decremented (Appendix B, addresses BOC4-BODD and BOBF-BOC2).

Figure 10:
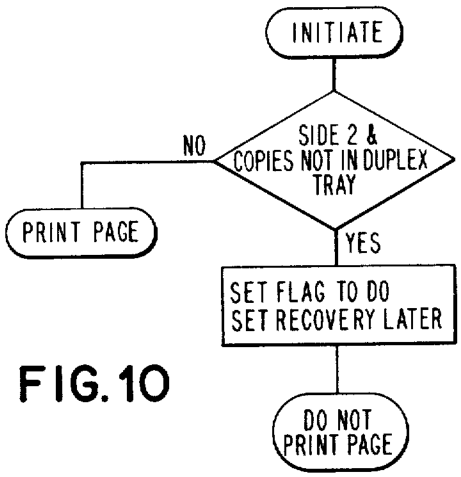

As shown in FIG. 10, before the printer is instructed to initiate printing, a determination in made as to whether it is side two copying and that copies are not in the duplex tray. If not, the page is printed, but, if so, a flag is set to do recovery later and the page is not printed (Appendix B, addresses BA7F-BA93).

Figure 11:
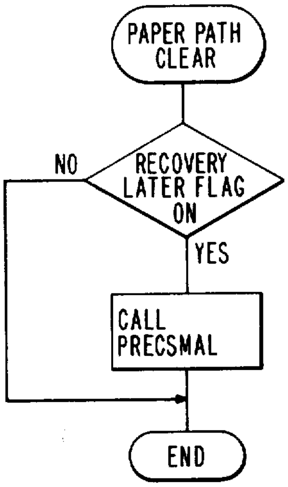
Figure 12:
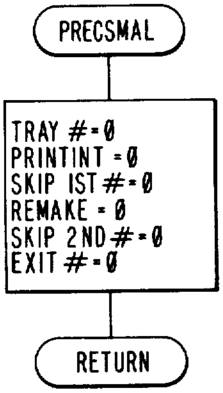

As shown in FIG. 11, if the paper path is clear and the recovery later flag (FIG. 10) is set, then PRECSMAL is called (Appendix B, addresses AE59-AE62). When PRECSMAL is called, a recovery subroutine is initiated and the registers are set to zero as indicated and shown in FIG. 12 (Appendix B, addresses BDB8-BCCF).

FIGS. 13 through 18 are flow charts concerned with billing control. When the pages of side one are made, they are billed. If replacement pages must later be made due to jams, these replacement pages are not to be rebilled. In addition, blank pages are not to be billed, and remake of sets due to double feeds are not to be rebilled.

For billing control set up, a billing inhibit control is provided in the printer and can be the same mechanism for both copy and print modes. When a copy interrupt occurs, it must reflect the proper inhibit state in the proper mode (print or copy). Billing set up is shown by the flow charts of FIGS. 13 through 17.

Figure 13:
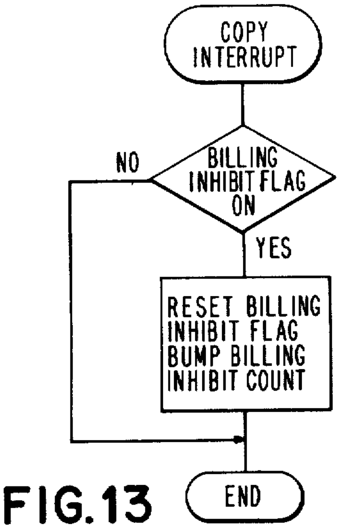
FIGS. 13 through 17 are flow charts depicting illustrative operation for effecting set up for billing control in the printer illustrated in FIG. 1.
Figure 14:
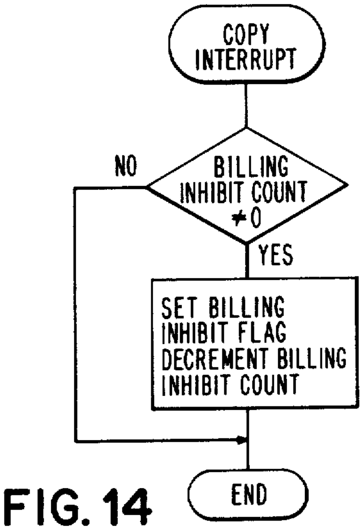

As shown in FIG. 13, when a copy interrupt occurs, a determination is made as to whether the billing inhibit flag is set, and, if so, the flag is reset and the billing inhibit count is bumped (Appendix B, addresses BDE-5-BDEC). As shown in FIG. 14, after the copy job is complete, it is determined whether the billing inhibit count is not equal to zero and, if not, the billing inhibit flag is set and the billing inhibit count is decremented (Appendix B, addresses BB0F-BB1B).

Figure 15:
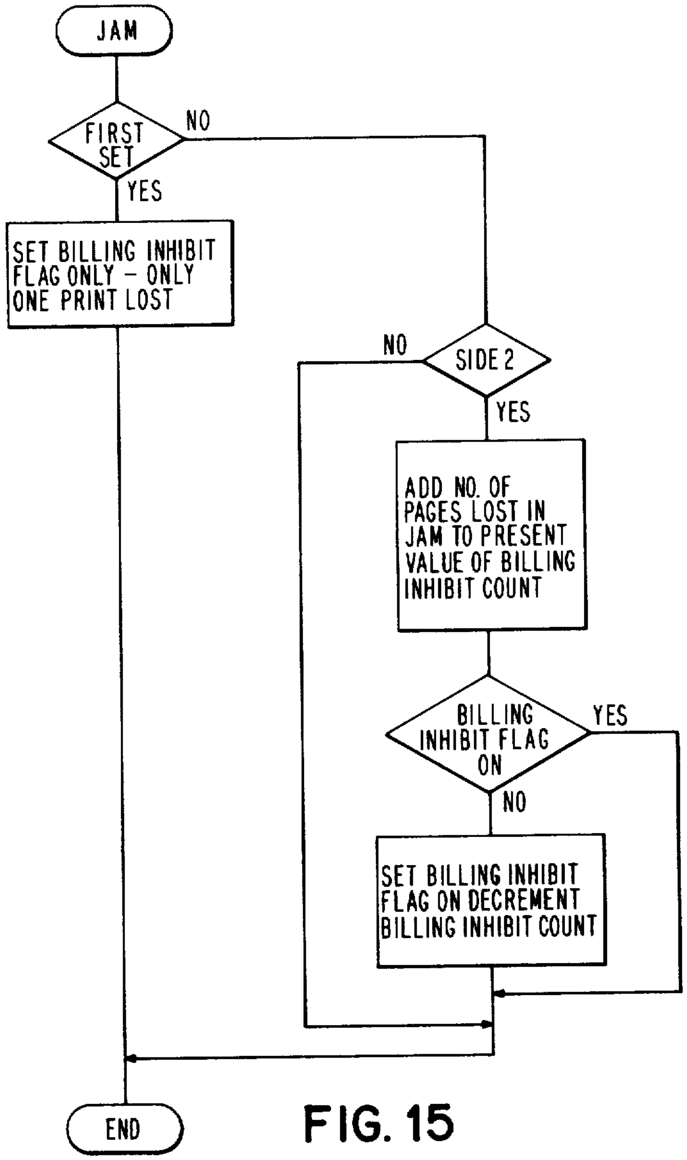

As shown in FIG. 15, when a jam occurs, it is determined whether a first set is being copied and, if so, then the billing inhibit flag only is set since only one print was lost (Appendix B, address BC13). If not a first set, and if on side two printing, then the number of pages lost in the jam is added to the then prevailing value of the billing inhibit count (Appendix B, addresses BC55-BC6A). It is then determined whether the billing inhibit flag is on and, if not, it is set and the billing inhibit count is decremented.

Any page can be forced blank by an operator, and such pages are not to be billed. At the time a page is printed there may be several other prints in the paper path on their way to the exit pocket. It is important to inhibit billing on the correct pages and not to inhibit billing on an arbitrary page due to potential paper jams and recovery necessary for billing control.

Figure 16:
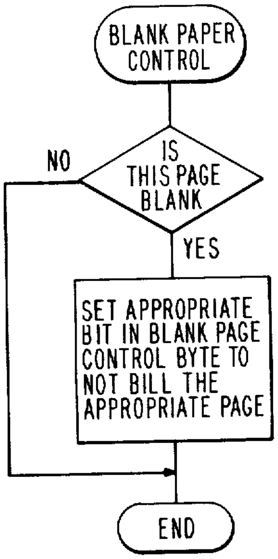

The set up for blank page (billing) control is shown in the flow chart of FIG. 16. As shown, a determination is made as to whether the page is blank and, if so, the appropriate bit is set in the blank page control byte not to bill the appropriate page (Appendix B, addresses BA9A-BAD6). The blank page control byte is a shift register which is shifted each time a sheet is billed with bit zero indicating that the next page is not to be billed. The appropriate bit is set in the shift register relative to when a page is to be billed.

Figure 17:
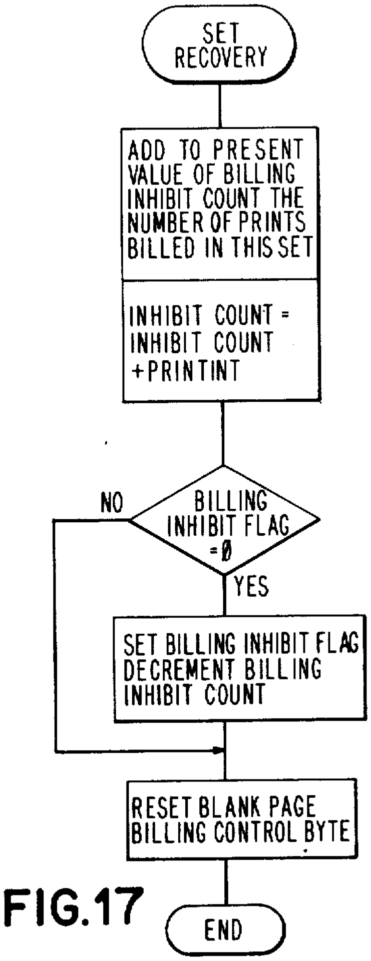

As brought out above, for double sheet feeds, the entire set is to be remade and the sides previously billed are not to be rebilled by generation of replacement copies. As shown in FIG. 17, for set recovery, the number of prints billed in the set is added to the prevailing value of the billing inhibit count so that the inhibit count is changed by adding thereto PRINTINT, i.e., the number of sheets to be remade (Appendix B, addresses BCB8-BCD8). If the billing inhibit flag is reset, the flag is set and the billing inhibit count is decremented, after which the blank page billing control byte is reset.

Figure 18:
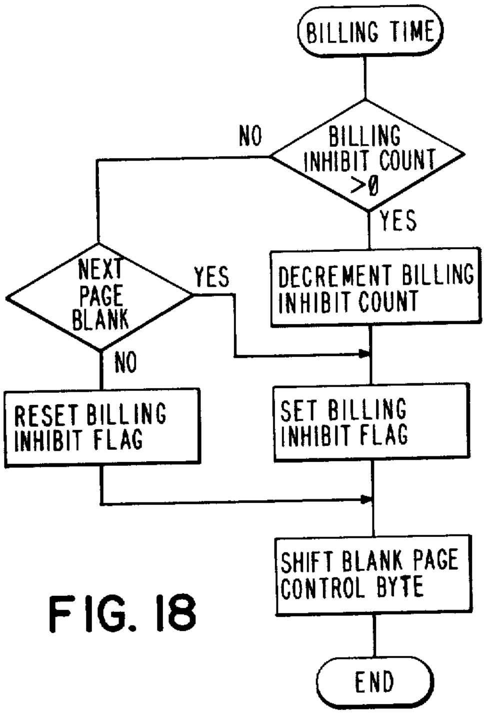
FIG. 18 is a flow chart depicting illustrative operation for effecting billing in the printer illustrated in the printer in FIG. 1.

Billing for sheets printed is shown by the flow chart of FIG. 18. As shown, a determination is made whether the billing inhibit count is greater than zero. If not, and if the next page is blank (using the bit zero of the blank page control byte), then the billing inhibit flag is set and the blank page control byte is shifted or else, the next page is not blank so the billing inhibit flag is reset and the blank page control byte is shifted. If the billing inhibit count is greater than zero, then the billing inhibit count is decremented, the billing inhibit flag is set, and the blank page control byte is shifted (Appendix B, addresses AC80-ACA2). The billing inhibit flag set indicates that the next sheet entering the appropriate exit pocket is not to be billed.

As can be appreciated from the foregoing, this invention provides an improved method and system for job recovery and is particularly well suited for automatically effecting job recovery from jams occurring during second side printing of duplex printing copies as well as providing updated billing information in conjunction therewith.

While the preferred embodiment of the invention has been illustrated and described, it is to be understood that it is not intended that this invention be limited to the precise construction herein disclosed and the right is reserved to all changes and modifications coming within the scope of the invention as defined in the appended claims.

TABLE 3

Y31 Register Control PAGE 01

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | C3 | DE | 02 | | | | | | | | | | | | | |
| 001 | | | | | | | | | | | | | | | | |
| 002 | | | | | 76 | | | | | | | | C3 | 0D | 01 | |
| 003 | | | | | C3 | 3F | 00 | | C3 | BD | 01 | | C3 | 54 | 02 | E5 |
| 004 | D5 | F5 | AF | D3 | C3 | DB | 80 | 5F | DB | 80 | 57 | DB | 40 | 6F | DB | 40 |
| 005 | 67 | DB | 33 | D3 | 3D | C5 | 47 | 3A | 0D | 22 | E6 | 10 | 78 | CA | 61 | 00 |
| 006 | 2F | E6 | 01 | CA | D7 | 00 | 3A | 76 | 20 | B7 | CA | B7 | 01 | 3D | 32 | 76 |
| 007 | 20 | F5 | FB | 7C | B7 | FA | 8C | 00 | B5 | CA | 8C | 00 | CD | A2 | 0D | EB |
| 008 | 2A | 72 | 20 | 19 | EB | 2A | 63 | 20 | 19 | DA | 8D | 00 | EB | F1 | B7 | CA |
| 009 | B3 | 00 | 3A | A6 | 20 | B7 | C2 | AD | 00 | EB | 2A | 19 | 22 | CD | 3A | 0D |
| 00A | AF | B4 | C2 | A6 | 01 | 3A | 71 | 20 | 95 | FA | A6 | 01 | EB | 22 | 15 | 22 |
| 00B | C3 | B7 | 01 | 3A | 56 | 20 | FE | 08 | CA | D1 | 00 | 3A | A6 | 20 | B7 | C2 |
| 00C | D1 | 00 | EB | 2A | 1B | 22 | CD | 3A | 0D | 3A | 71 | 20 | 95 | FA | A6 | 01 |
| 00D | EB | 22 | 11 | 22 | C3 | B7 | 01 | 3A | 76 | 20 | 47 | 3A | 78 | 20 | B8 | CA |
| 00E | B7 | 01 | DA | B7 | 01 | 3D | 32 | 78 | 20 | F5 | FB | CD | A2 | 0D | EB | 2A |
| 00F | 72 | 20 | 19 | EB | 2A | 63 | 20 | 19 | DA | FC | 00 | EB | F1 | B7 | CA | 07 |

TABLE 3 (CONTINUED)

131 Register Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 010 | 01 | 22 | 17 | 22 | C3 | B7 | 01 | 22 | 13 | 22 | C3 | B7 | 01 | E5 | D5 | F5 |
| 011 | 3E | 40 | D3 | C3 | DB | 81 | 5F | DB | 81 | 57 | DB | 41 | 6F | DB | 41 | 67 |
| 012 | DB | 33 | D3 | 3F | C5 | 47 | 3A | 0D | 22 | E6 | 10 | 78 | CA | 30 | 01 | 2F |
| 013 | E6 | 02 | CA | 7C | 01 | 3A | 77 | 20 | B7 | CA | B7 | 01 | 3D | 32 | 77 | 20 |
| 014 | FB | 7C | B7 | FA | 5A | 01 | B5 | CA | 5A | 01 | CD | A2 | 0D | EB | 2A | 74 |
| 015 | 20 | 19 | EB | 2A | 63 | 20 | 19 | DA | 5B | 01 | EB | 3A | A6 | 20 | B7 | C2 |
| 016 | 76 | 01 | EB | 2A | 19 | 22 | CD | 3A | 0D | AF | B4 | C2 | B0 | 01 | 3A | 71 |
| 017 | 20 | 95 | FA | B0 | 01 | EB | 22 | 15 | 22 | C3 | B7 | 01 | 3A | 77 | 20 | 47 |
| 018 | 3A | 79 | 20 | B8 | CA | B7 | 01 | DA | B7 | 01 | 3D | 32 | 79 | 20 | FB | CD |
| 019 | A2 | 0D | EB | 2A | 74 | 20 | 19 | EB | 2A | 63 | 20 | 19 | DA | A0 | 01 | EB |
| 01A | 22 | 17 | 22 | C3 | B7 | 01 | 3A | 76 | 20 | 3C | 32 | 76 | 20 | C3 | B7 | 01 |
| 01B | 3A | 77 | 20 | 3C | 32 | 77 | 20 | C1 | F1 | D1 | E1 | FB | C9 | F5 | 3E | 04 |
| 01C | 32 | 03 | 23 | FB | E5 | D5 | C5 | 3A | 00 | 23 | 3A | 02 | 23 | E6 | 02 | CA |
| 01D | 47 | 02 | 3A | 01 | 23 | E6 | 03 | FE | 02 | CA | 20 | 02 | FE | 01 | C2 | 47 |
| 01E | 02 | D3 | 38 | CD | 96 | 02 | FE | 04 | C2 | 04 | 02 | CD | 96 | 02 | B7 | 32 |
| 01F | 1F | 22 | CA | 00 | 00 | CD | 96 | 02 | 32 | 0C | 22 | CD | 96 | 02 | 32 | 0D |
| 020 | 22 | C3 | 00 | 00 | FE | 01 | CC | DA | 0C | FE | 02 | CC | E0 | 0C | FE | 03 |
| 021 | CC | 90 | 0C | FE | 05 | CC | 13 | 0D | FE | 08 | CC | BF | 0C | C3 | 48 | 02 |
| 022 | 06 | 0B | 21 | 06 | 22 | 0E | 3B | 7E | 23 | 32 | 00 | 23 | D3 | 39 | 3A | 02 |
| 023 | 23 | E6 | 20 | C2 | 3D | 02 | 0D | C2 | 2E | 02 | C3 | 48 | 02 | 3A | 00 | 23 |
| 024 | 05 | C2 | 27 | 02 | C3 | 48 | 02 | 00 | C1 | D1 | E1 | 3E | 05 | F3 | 32 | 03 |
| 025 | 23 | F1 | FB | C9 | F5 | D5 | E5 | 2A | 58 | 20 | 22 | 5A | 20 | CD | 3F | 0C |
| 026 | 22 | 58 | 20 | 20 | F6 | 4C | EE | 80 | 30 | FB | 2A | 5A | 20 | EB | 2A | 58 |
| 027 | 20 | CD | 3A | 0D | 22 | 5E | 20 | 32 | 60 | 20 | CD | AE | 02 | 22 | 0E | 22 |
| 028 | 3A | 57 | 20 | 3C | 32 | 57 | 20 | CD | 3C | 03 | 20 | E6 | 83 | F6 | 48 | F3 |
| 029 | 30 | E1 | D1 | F1 | FB | C9 | 0E | 3B | 3A | 02 | 23 | E6 | 20 | C2 | A8 | 02 |
| 02A | 0D | C2 | 98 | 02 | D1 | C3 | 48 | 02 | 3A | 00 | 23 | D3 | 38 | C9 | 11 | 00 |
| 02B | 00 | 2A | 5E | 20 | CD | CA | 0D | CD | D7 | 02 | CD | CA | 0D | CD | CA | 0D |
| 02C | CD | D7 | 02 | CD | D7 | 02 | CD | CA | 0D | CD | D7 | 02 | EB | 3A | 0D | 22 |
| 02D | E6 | 80 | C8 | CD | CA | 0D | C9 | CD | CA | 0D | EB | 19 | EB | C9 | F3 | 31 |
| 02E | 50 | 20 | CD | E1 | 07 | 21 | 03 | 00 | 7D | 21 | 81 | 20 | 22 | 7F | 20 | EB |
| 02F | 21 | EA | 0D | 23 | 23 | 4E | 23 | 46 | 23 | EB | 23 | 7L | 23 | 70 | 23 | EB |
| 030 | 3D | C2 | F3 | 02 | CD | 02 | 08 | FB | C3 | 25 | 03 | 2A | 7F | 20 | 77 | FB |
| 031 | 23 | D1 | 73 | 23 | 72 | 2A | 7F | 20 | 23 | 23 | 23 | 22 | 7F | 20 | 23 | 7E |
| 032 | 23 | B6 | C2 | 2B | 03 | 21 | 81 | 20 | 22 | 7F | 20 | 2A | 7F | 20 | 7E | B7 |
| 033 | C2 | 15 | 03 | 23 | 31 | 50 | 20 | 5E | 23 | 56 | EB | E9 | E5 | F5 | 21 | 81 |
| 034 | 20 | 7E | B7 | F2 | 47 | 03 | 34 | 23 | 7E | 23 | B6 | 23 | C2 | 41 | 03 | F1 |
| 035 | E1 | C9 | 3A | 7A | 20 | 32 | 76 | 20 | 32 | 78 | 20 | 3A | 56 | 20 | FE | 0C |
| 036 | C2 | 6C | 03 | 3A | 7A | 20 | 32 | 77 | 20 | 32 | 79 | 20 | CD | 61 | 04 | FA |
| 037 | 52 | 03 | DA | FB | 03 | C2 | 08 | 04 | C3 | DC | 03 | CD | 95 | 09 | 3E | 18 |
| 038 | CD | 93 | 07 | CD | 61 | 04 | FA | 8C | 03 | C3 | 94 | 03 | 3E | 01 | 32 | A6 |
| 039 | 20 | C3 | 83 | 03 | CD | 76 | 04 | 22 | 09 | 22 | 22 | 1D | 22 | 2A | 15 | 22 |
| 03A | 22 | 19 | 22 | 2A | 11 | 22 | 22 | 1B | 22 | DA | 8C | 03 | CD | 9D | 0B | 3A |
| 03B | 56 | 20 | FE | 0C | CC | EF | 0B | 3E | 00 | 32 | A6 | 20 | CD | 61 | 04 | DA |
| 03C | 8C | 03 | FA | 8C | 03 | CD | 61 | 04 | DA | 8C | 03 | FA | 8C | 03 | CD | 61 |
| 03D | 04 | DA | 8C | 03 | FA | 8C | 03 | 3E | 18 | CD | 9C | 07 | CD | 61 | 04 | FA |
| 03E | 02 | 04 | DA | FB | 03 | C2 | 08 | 04 | 3A | A6 | 20 | B7 | C2 | 7B | 03 | CD |
| 03F | B4 | 09 | 32 | 08 | 22 | CD | 7A | 09 | C3 | DC | 03 | 3A | A6 | 20 | B7 | C2 |

TABLE 3 (CONTINUED)

Y31 Register Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 040 | 7B | 03 | CD | 95 | 09 | C3 | DC | 03 | DB | 33 | E6 | 04 | C2 | 14 | 04 | D3 |
| 041 | 3A | C3 | 08 | 04 | CD | 61 | 04 | CA | 46 | 04 | FA | 46 | 04 | DA | 46 | 04 |
| 042 | CD | B4 | 09 | 32 | 08 | 22 | CD | F6 | 09 | CD | 7A | 09 | 47 | E6 | 7F | 4F |
| 043 | 3A | 52 | 20 | 81 | F2 | 38 | 04 | AF | 4F | 78 | E6 | 80 | B1 | 32 | 20 | 22 |
| 044 | CD | A2 | 0A | C3 | 14 | 04 | AF | CD | A2 | 0A | 3E | FD | CD | 0B | 03 | DB |
| 045 | 33 | E6 | 04 | CA | 5B | 04 | D3 | 3A | C3 | 4F | 04 | CD | 95 | 09 | C3 | DC |
| 046 | 03 | E1 | 22 | 98 | 20 | 3E | 7F | CD | 0B | 03 | 3A | 90 | 20 | B7 | 3A | 91 |
| 047 | 20 | 1F | 2A | 98 | 20 | E9 | 3A | 56 | 20 | B7 | CA | CC | 04 | FE | 08 | CA |
| 048 | AC | 04 | 2A | 19 | 22 | EB | 2A | 15 | 22 | CD | DB | 04 | D8 | 2A | 1B | 22 |
| 049 | EB | 2A | 11 | 22 | CD | DB | 04 | D8 | 2A | 11 | 22 | EB | 2A | 15 | 22 | CD |
| 04A | DB | 04 | C0 | EB | 2A | 61 | 20 | EB | CD | A2 | 0D | C9 | 2A | 19 | 22 | EB |
| 04B | 2A | 15 | 22 | CD | DB | 04 | D8 | 2A | 11 | 22 | EB | 2A | 15 | 22 | CD | DB |
| 04C | 04 | D8 | C0 | EB | 2A | 61 | 20 | EB | CD | A2 | 0D | C9 | 2A | 1B | 22 | EB |
| 04D | 2A | 11 | 22 | CD | DB | 04 | D8 | 2A | 11 | 22 | C9 | CD | 3A | 0D | B7 | C0 |
| 04E | EB | 2A | 70 | 20 | 26 | 00 | CD | AD | 0D | DA | EE | 04 | 37 | C9 | EB | B7 |
| 04F | C9 | 3E | FF | CD | 0B | 03 | CD | 41 | 09 | AF | 32 | 90 | 20 | 06 | 08 | 2A |
| 050 | 58 | 20 | EB | 2A | 63 | 20 | 2B | 19 | DA | 48 | 05 | 2A | 5E | 20 | 3A | 60 |
| 051 | 20 | B7 | C2 | 48 | 05 | EB | 2A | 65 | 20 | 19 | DA | 48 | 05 | 06 | 04 | 2A |
| 052 | 67 | 20 | 19 | 3E | 08 | DA | 33 | 05 | CD | C7 | 07 | 3E | 01 | 32 | 94 | 20 |
| 053 | C3 | 48 | 05 | CD | D0 | 07 | AF | 32 | 94 | 20 | 3A | 8F | 20 | B7 | CA | 6C |
| 054 | 05 | 3D | 32 | 8F | 20 | C3 | 06 | 07 | 78 | 32 | 0B | 22 | 3A | 07 | 22 | E6 |
| 055 | 06 | 32 | 07 | 22 | CD | 23 | 0C | CD | 2A | 07 | 2A | 7B | 20 | 36 | 00 | 3E |
| 056 | 03 | CD | D0 | 07 | 3E | 0A | 32 | 8F | 20 | C3 | 06 | 07 | 3A | 0B | 22 | E6 |
| 057 | 03 | 32 | 0B | 22 | 3A | 07 | 22 | F6 | 02 | 32 | 07 | 22 | 3A | A6 | 20 | FE |
| 058 | 02 | C2 | B4 | 05 | 3A | 77 | 20 | 47 | 3A | 76 | 20 | B0 | C2 | 9F | 05 | 2A |
| 059 | 7B | 20 | 36 | 00 | 3E | 01 | 32 | 93 | 20 | 32 | 92 | 20 | C3 | 06 | 07 | 3A |
| 05A | 8E | 20 | 47 | 3A | 10 | 22 | 90 | FE | 03 | DA | 06 | 07 | 3E | 01 | 32 | A6 |
| 05B | 20 | C3 | 06 | 07 | 2A | 11 | 22 | EB | 2A | 58 | 20 | CD | 3A | 0D | B7 | C2 |
| 05C | 89 | 06 | EB | 2A | 69 | 20 | CD | A2 | 0D | DA | 95 | 06 | 3A | 93 | 20 | B7 |
| 05D | CA | D6 | 05 | F2 | 95 | 06 | 3A | A6 | 20 | FE | 01 | CA | 1A | 06 | 3E | 01 |
| 05E | 32 | 93 | 20 | CD | 9D | 0B | 3A | 76 | 20 | 47 | 3A | 77 | 20 | B0 | C2 | 45 |
| 05F | 06 | 32 | 0B | 22 | 3A | 7A | 20 | 32 | 76 | 20 | 32 | 78 | 20 | 2A | 7B | 20 |
| 060 | 36 | 00 | AF | 32 | 91 | 20 | 3E | 03 | CD | D0 | 07 | 2A | 15 | 22 | 22 | 19 |
| 061 | 22 | 2A | 11 | 22 | 22 | 1B | 22 | C3 | 95 | 06 | 3A | 7A | 20 | 32 | 76 | 20 |
| 062 | 32 | 78 | 20 | 3A | 56 | 20 | FE | 0C | C2 | 34 | 06 | 3A | 7A | 20 | 32 | 77 |
| 063 | 20 | 32 | 79 | 20 | CD | 43 | 0B | 3E | 02 | 32 | A6 | 20 | 3A | 10 | 22 | 32 |
| 064 | 8E | 20 | C3 | 06 | 07 | 3E | 01 | 32 | 91 | 20 | 06 | 00 | 3A | 76 | 20 | B7 |
| 065 | CA | 55 | 06 | 06 | 02 | 3A | 77 | 20 | B7 | 78 | CA | 5F | 06 | F6 | 01 | 32 |
| 066 | 0B | 22 | 47 | CD | C7 | 07 | 78 | 2F | E6 | 03 | CD | D0 | 07 | 3A | 07 | 22 |
| 067 | E6 | 06 | 32 | 07 | 22 | CD | 2F | 07 | 2A | 7B | 20 | 36 | 00 | 3A | 7A | 20 |
| 068 | 32 | 76 | 20 | 32 | 78 | 20 | C3 | 95 | 06 | 3A | 93 | 20 | B7 | FA | 95 | 06 |
| 069 | 3E | FF | 32 | 93 | 20 | 3A | 56 | 20 | FE | 0C | C2 | DA | 06 | 2A | 15 | 22 |
| 06A | EB | 2A | 58 | 20 | CD | 3A | 0D | B7 | C2 | CE | 06 | EB | 2A | 69 | 20 | CD |
| 06B | A2 | 0D | DA | DA | 06 | 3A | 92 | 20 | B7 | CA | BF | 06 | F2 | DA | 06 | CD |
| 06C | EF | 0B | 3A | 7A | 20 | 32 | 77 | 20 | 32 | 79 | 20 | C3 | DA | 06 | 3A | 92 |
| 06D | 20 | B7 | FA | DA | 06 | 3E | FF | 32 | 92 | 20 | 3A | 91 | 20 | B7 | C2 | 06 |
| 06E | 07 | 3E | 20 | CD | D0 | 07 | 3A | 07 | 22 | F6 | 01 | 32 | 07 | 22 | 3A | 94 |
| 06F | 20 | B7 | C2 | 06 | 07 | 3A | 05 | 22 | B7 | CA | 01 | 07 | 3E | 01 | 32 | 90 |

TABLE 3 (CONTINUED)

YSI Register Control PAGE 04

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 070 | 20 | 3E | 04 | CD | AD | 07 | 2A | 5C | 20 | EB | 2A | 58 | 20 | CD | 3A | 0D |
| 071 | 47 | 3A | 8D | 20 | B7 | 78 | 32 | 8D | 20 | CA | F1 | 04 | B7 | C2 | F1 | 04 |
| 072 | 3A | 10 | 22 | 3C | 32 | 10 | 22 | C3 | F1 | 04 | 3E | FF | 32 | 90 | 20 | 3E |
| 073 | 04 | CD | B6 | 07 | 3E | 20 | CD | C7 | 07 | C9 | CD | 92 | 07 | 3E | FF | CD |
| 074 | 0B | 03 | 3A | A5 | 20 | 47 | 3A | A4 | 20 | 32 | A5 | 20 | A0 | 47 | DB | 2B |
| 075 | 32 | A4 | 20 | 2F | A0 | CA | 6C | 07 | 1F | DC | E0 | 0C | 1F | DC | DA | 0C |
| 076 | 1F | DC | 90 | 0C | 1F | DC | 13 | 0D | 1F | DC | BF | 0C | 3A | A7 | 20 | 3D |
| 077 | FA | 8F | 07 | 32 | A7 | 20 | CA | 86 | 07 | FE | 19 | C2 | 8F | 07 | 3E | 03 |
| 078 | CD | B6 | 07 | C3 | 8F | 07 | 3A | A4 | 20 | 2F | E6 | 03 | C4 | E6 | 0C | C3 |
| 079 | 3D | 07 | C9 | C5 | 47 | 3A | AA | 20 | B0 | C3 | A3 | 07 | C5 | 2F | 47 | 3A |
| 07A | AA | 20 | A0 | 32 | AA | 20 | D3 | 31 | 32 | 06 | 24 | C1 | C9 | C5 | 47 | 3A |
| 07B | AB | 20 | B0 | C3 | BD | 07 | C5 | 2F | 47 | 3A | AB | 20 | A0 | 32 | AB | 20 |
| 07C | D3 | 31 | 32 | 05 | 24 | C1 | C9 | C5 | 47 | 3A | AC | 20 | B0 | C3 | D7 | 07 |
| 07D | C5 | 2F | 47 | 3A | AC | 20 | A0 | 32 | AC | 20 | D3 | 31 | 32 | 03 | 24 | C1 |
| 07E | C9 | D1 | 21 | 00 | 20 | 01 | 00 | 02 | AF | 77 | 23 | 0B | 78 | B1 | C2 | E8 |
| 07F | 07 | 21 | 81 | 20 | 23 | 23 | 23 | 22 | 7B | 20 | 23 | 23 | 23 | 22 | 7D | 20 |
| 080 | EB | E9 | 3E | 19 | 30 | 3E | DA | D3 | 2C | 3E | 6F | D3 | 2D | 3E | C0 | D3 |
| 081 | 28 | 3A | 1F | 22 | B7 | C2 | 22 | 08 | DB | 29 | 32 | 0C | 22 | DB | 2A | 32 |
| 082 | 0D | 22 | AF | 32 | 1F | 22 | DB | 2B | E6 | 20 | 32 | 6F | 20 | 3E | 03 | D3 |
| 083 | 30 | DB | 33 | E6 | 04 | CA | 3D | 08 | D3 | 3A | C3 | 31 | 08 | 3E | FF | CD |
| 084 | 9C | 07 | CD | B6 | 07 | CD | D0 | 07 | 3A | 05 | 22 | FE | 01 | 3E | 20 | CA |
| 085 | 58 | 08 | AF | 32 | 05 | 22 | 3E | 08 | CD | AD | 07 | 3E | C6 | 32 | 03 | 23 |
| 086 | 3E | 05 | 32 | 03 | 23 | 2A | 0C | 22 | CD | D5 | 0D | CD | DF | 0D | 32 | 50 |
| 087 | 20 | CD | D5 | 0D | 3C | CD | DF | 0D | 32 | 51 | 20 | CD | D5 | 0D | CA | 86 |
| 088 | 08 | CD | DF | 0D | 2F | 3C | 32 | 52 | 20 | CD | D5 | 0D | 3C | 32 | 53 | 20 |
| 089 | CD | D5 | 0D | 32 | 54 | 20 | CD | DF | 0D | 3D | 32 | 55 | 20 | 21 | 61 | 20 |
| 08A | E5 | 3A | 0D | 22 | E6 | 80 | 21 | F6 | 0D | CA | AF | 08 | 21 | FE | 0D | 06 |
| 08B | 04 | 5E | 23 | 56 | 23 | E3 | 73 | 23 | 72 | 23 | E3 | 05 | C2 | B1 | 08 | E1 |
| 08C | 3A | 0D | 22 | E6 | 40 | 21 | 7C | 00 | CA | CE | 08 | 21 | FA | 00 | 22 | 69 |
| 08D | 20 | 22 | 6B | 20 | 7D | 0F | 32 | 70 | 20 | 1F | 32 | 71 | 20 | 3A | 0D | 22 |
| 08E | E6 | 0C | 32 | 56 | 20 | FE | 08 | 3E | 01 | C2 | EE | 08 | 3E | 02 | 32 | 7A |
| 08F | 20 | 3A | 56 | 20 | FE | 0C | C2 | FF | 08 | 20 | E6 | FE | F6 | 08 | 30 | CD |
| 090 | 23 | 0C | CD | 3F | 0C | 22 | 58 | 20 | 22 | 5C | 20 | 3E | 0A | CD | 33 | 09 |
| 091 | 3E | 14 | FB | 76 | 3D | C2 | 13 | 09 | F3 | DB | 30 | E6 | 40 | 3E | 01 | C2 |
| 092 | 23 | 09 | AF | 32 | 6E | 20 | AF | CD | 33 | 09 | 3E | 32 | D3 | 43 | 3E | 72 |
| 093 | D3 | 43 | C9 | D3 | 32 | D3 | 34 | AF | D3 | 35 | 3E | C3 | D3 | 30 | D3 | 3B |
| 094 | C9 | F5 | 3A | 6E | 20 | B7 | C2 | 78 | 09 | 3E | 06 | CD | 9C | 07 | DB | 33 |
| 095 | E6 | 08 | C2 | 63 | 09 | 3A | 6F | 20 | B7 | 3E | 04 | C2 | 60 | 09 | 3E | 02 |
| 096 | CD | 93 | 07 | DB | 33 | E6 | 10 | C2 | 78 | 09 | 3A | 6F | 20 | B7 | 3E | 02 |
| 097 | C2 | 75 | 09 | 3E | 04 | CD | 93 | 07 | F1 | C9 | C5 | F5 | 47 | E6 | 7F | 4F |
| 098 | 3A | 51 | 20 | B9 | F4 | 9D | 09 | F2 | 92 | 09 | 78 | B7 | F4 | A3 | 09 | FC |
| 099 | A9 | 09 | F1 | C1 | C9 | F5 | 3E | 19 | CD | 9C | 07 | F1 | C9 | F5 | 3E | 01 |
| 09A | C3 | AC | 09 | F5 | 3E | 10 | C3 | AC | 09 | F5 | 3E | 08 | CD | 95 | 09 | CD |
| 09B | 93 | 07 | F1 | C9 | E5 | D5 | 2A | 11 | 22 | EB | 3A | 56 | 20 | B7 | CA | D7 |
| 09C | 09 | 2A | 15 | 22 | CD | 3A | 0D | B7 | C2 | D3 | 09 | EB | 2A | 61 | 20 | EB |
| 09D | CD | A2 | 0D | 22 | 1D | 22 | EB | 2A | 09 | 22 | EB | CD | 3A | 0D | 11 | 81 |
| 09E | FF | 19 | D2 | E8 | 09 | 21 | 00 | 00 | 11 | 7F | 00 | 19 | B7 | CA | F2 | 09 |
| 09F | 3E | 80 | B5 | D1 | E1 | C9 | C5 | D5 | E5 | 4F | E6 | 7F | CA | 0C | 0A | 79 |

TABLE 3 (CONTINUED)

(3) Register Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0A0 | E6 | 80 | 47 | 3A | A3 | 20 | E6 | 80 | A8 | C2 | 61 | 0A | 21 | 9B | 20 | 3A |
| 0A1 | 9A | 20 | 5F | 16 | 00 | 19 | 3C | 47 | 3A | 55 | 20 | A0 | 32 | 9A | 20 | 46 |
| 0A2 | 79 | E6 | 7F | 4F | 77 | 2A | 96 | 20 | EB | 68 | 26 | 00 | CD | A2 | 0D | 5F |
| 0A3 | 16 | 00 | 19 | 22 | 96 | 20 | 3A | 54 | 20 | 3D | FA | 43 | 0A | CD | CA | 0D |
| 0A4 | C3 | 39 | 0A | 79 | BD | D2 | 49 | 0A | 6F | 7D | B7 | 06 | 01 | CA | 52 | 0A |
| 0A5 | 06 | 00 | 3A | A3 | 20 | E6 | 80 | B0 | 32 | A3 | 20 | E6 | 80 | B5 | C3 | 9E |
| 0A6 | 0A | 3A | A3 | 20 | EE | 80 | 32 | A3 | 20 | 79 | E6 | 7F | 5F | 16 | 00 | 21 |
| 0A7 | 9B | 20 | 3A | 55 | 20 | 73 | 23 | 3D | F2 | 75 | 0A | 3A | 55 | 20 | 21 | 00 |
| 0A8 | 00 | 19 | 3D | F2 | 81 | 0A | 22 | 96 | 20 | 3A | A3 | 20 | E6 | 01 | 79 | C2 |
| 0A9 | 94 | 0A | E6 | 80 | 6F | 3A | A3 | 20 | E6 | 80 | 32 | A3 | 20 | 7D | E1 | D1 |
| 0AA | C1 | C9 | E5 | D5 | C5 | F5 | 47 | 3A | 6E | 20 | B7 | CA | C9 | 0A | 78 | E6 |
| 0AB | 7F | C2 | BC | 0A | 3E | 06 | CD | 9C | 07 | C3 | C9 | 0A | 78 | E6 | 80 | 3E |
| 0AC | 02 | CA | C6 | 0A | 3E | 04 | CD | 93 | 07 | 3A | 6F | 20 | B7 | CA | D4 | 0A |
| 0AD | 78 | EE | 80 | 47 | 2A | 0E | 22 | AF | EB | 21 | 32 | 00 | CD | A2 | 0D | DA |
| 0AE | E8 | 0A | 3C | FE | 0F | DA | D8 | 0A | 07 | 07 | 4F | 3A | 53 | 20 | 3D | 81 |
| 0AF | 5F | 16 | 00 | 21 | 06 | 0E | 19 | 4E | 78 | E6 | 7F | CA | 15 | 0B | FE | 06 |
| 0B0 | FA | 05 | 0B | 3E | 06 | 5F | 21 | 46 | 0E | 19 | 5E | 79 | C3 | 11 | 0B | B7 |
| 0B1 | 1F | 1D | F2 | 0F | 0B | 4F | 78 | E6 | 80 | B1 | D3 | 32 | 78 | E6 | 7F | CA |
| 0B2 | 3E | 0B | 5F | 16 | 00 | 3A | 53 | 20 | 21 | 00 | 00 | 19 | 3D | C2 | 2B | 0B |
| 0B3 | 7D | D3 | 34 | 7C | F6 | 80 | D3 | 35 | 3E | C3 | D3 | 30 | D3 | 3B | F1 | C1 |
| 0B4 | D1 | E1 | C9 | E5 | D5 | C5 | F5 | 3E | 01 | 32 | 6D | 20 | 3E | B2 | D3 | C3 |
| 0B5 | 2A | 61 | 20 | 7D | D3 | 82 | 7C | D3 | 82 | 7D | D3 | 42 | 7C | D3 | 42 | 2A |
| 0B6 | 11 | 22 | 3A | 56 | 20 | FE | 08 | C2 | 6D | 0B | 2A | 15 | 22 | EB | F3 | CD |
| 0B7 | 74 | 0C | CD | 3F | 0C | CD | 54 | 0C | 3A | 70 | 20 | C6 | 02 | 16 | 00 | 5F |
| 0B8 | 19 | 22 | 72 | 20 | 22 | 74 | 20 | 7D | D3 | 40 | 7C | D3 | 40 | 7D | D3 | 41 |
| 0B9 | 7C | D3 | 41 | D3 | 3C | D3 | 3E | FB | F1 | C1 | D1 | E1 | C9 | E5 | D5 | C5 |
| 0BA | F5 | 3A | 56 | 20 | FE | 08 | C2 | B4 | 0B | 2A | 1D | 22 | EB | 2A | 69 | 20 |
| 0BB | 19 | 22 | 6B | 20 | 3E | B2 | D3 | 83 | 2A | 6B | 20 | 7D | D3 | 82 | 7C | D3 |
| 0BC | 82 | 2A | 15 | 22 | 3A | 56 | 20 | FE | 08 | F3 | CA | D0 | 0B | 2A | 11 | 22 |
| 0BD | EB | CD | 74 | 0C | CD | 3F | 0C | CD | 54 | 0C | 22 | 72 | 20 | 7D | D3 | 40 |
| 0BE | 7C | D3 | 40 | D3 | 3C | AF | 32 | 6D | 20 | FB | F1 | C1 | D1 | E1 | C9 | E5 |
| 0BF | D5 | C5 | F5 | 3E | B2 | D3 | 43 | 2A | 6B | 20 | 7D | D3 | 42 | 7C | D3 | 42 |
| 0C0 | F3 | 2A | 15 | 22 | EB | CD | 74 | 0C | CD | 49 | 0C | CD | 54 | 0C | 22 | 74 |
| 0C1 | 20 | 7D | D3 | 41 | 7C | D3 | 41 | D3 | 3E | AF | 32 | 6D | 20 | FB | F1 | C1 |
| 0C2 | D1 | E1 | C9 | F5 | E5 | 3E | 3A | D3 | 83 | 3E | 7A | D3 | 83 | 2A | 61 | 20 |
| 0C3 | 7D | D3 | 80 | 7C | D3 | 80 | 7D | D3 | 81 | 7C | D3 | 81 | E1 | F1 | C9 | AF |
| 0C4 | D3 | 83 | DB | 80 | 6F | DB | 80 | 67 | C9 | 3E | 40 | D3 | 83 | DB | 81 | 6F |
| 0C5 | DB | 81 | 67 | C9 | CD | 3A | 0D | B7 | CA | 63 | 0C | CD | 98 | 0D | EB | 2A |
| 0C6 | 61 | 20 | 19 | EB | 2A | 70 | 20 | 26 | 00 | 19 | CD | 98 | 0D | EB | 2A | 61 |
| 0C7 | 20 | 19 | 09 | C9 | 2A | 5E | 20 | 4C | 06 | 00 | CD | CA | 0D | CD | CA | 0D |
| 0C8 | CD | CA | 0D | CD | CA | 0D | CD | CA | 0D | 09 | CD | 98 | 0D | 44 | 4D | C9 |
| 0C9 | F5 | 3E | 28 | CD | B6 | 07 | 3A | 05 | 22 | B7 | 3A | 07 | 22 | CA | AE | 0C |
| 0CA | E6 | 03 | 32 | 07 | 22 | AF | 32 | 05 | 22 | 3E | 08 | C3 | BA | 0C | F6 | 04 |
| 0CB | 32 | 07 | 22 | 3E | 01 | 32 | 05 | 22 | 3E | 20 | CD | AD | 07 | F1 | C9 | F5 |
| 0CC | 3A | 05 | 22 | B7 | C2 | D8 | 0C | 3A | A6 | 20 | B7 | C2 | D8 | 0C | 3E | 01 |
| 0CD | 32 | A6 | 20 | 2A | 7B | 20 | 36 | 00 | F1 | C9 | 21 | 02 | 00 | C3 | E3 | 0C |
| 0CE | 21 | 01 | 01 | 22 | A8 | 20 | F5 | 3A | 05 | 22 | B7 | CA | 11 | 0D | 2A | A8 |
| 0CF | 20 | 3E | 03 | CD | B6 | 07 | 7D | CD | AD | 07 | 7C | 2A | 09 | 22 | EB | 2A |

TABLE 3 (CONTINUED)

/3I Register Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0D0 | 50 | 20 | 26 | 00 | CD | 67 | 0D | F3 | 22 | 09 | 22 | FB | 3E | 32 | 32 | A7 |
| 0D1 | 20 | F1 | C9 | 3A | 05 | 22 | B7 | C0 | 2A | 11 | 22 | 3A | 56 | 20 | B7 | CA |
| 0D2 | 36 | 0D | 2A | 1D | 22 | 3A | 56 | 20 | FE | 0C | CA | 36 | 0D | EB | 2A | 69 |
| 0D3 | 20 | 19 | 22 | 6B | 20 | EB | 22 | 09 | 22 | C9 | C5 | D5 | E5 | CD | A2 | 0D |
| 0D4 | D2 | 48 | 0D | EB | 2A | 61 | 20 | 19 | 4D | 44 | D1 | E1 | E5 | CD | A2 | 0D |
| 0D5 | D2 | 58 | 0D | EB | 2A | 61 | 20 | 19 | 59 | 50 | CD | AD | 0D | 3E | 01 | DA |
| 0D6 | 64 | 0D | EB | AF | D1 | C1 | C9 | D5 | F5 | B7 | C2 | 7E | 0D | CD | A2 | 0D |
| 0D7 | CD | AD | 0D | DA | 7B | 0D | EB | 2A | 61 | 20 | 19 | F1 | D1 | C9 | 19 | CD |
| 0D8 | AD | 0D | DA | 90 | 0D | EB | 2A | 61 | 20 | CD | AD | 0D | EB | D2 | 95 | 0D |
| 0D9 | EB | 2A | 63 | 20 | 19 | F1 | D1 | C9 | F5 | 7D | 2F | 6F | 7C | 2F | 67 | 23 |
| 0DA | F1 | C9 | C5 | 47 | 7B | 95 | 6F | 7A | 9C | 67 | 78 | C1 | C9 | C5 | 47 | 7D |
| 0DB | 93 | 7C | 9A | 78 | C1 | C9 | F5 | 29 | F1 | C9 | F5 | B7 | 7C | 1F | 67 | 7D |
| 0DC | 1F | 6F | F1 | C9 | F5 | EB | 29 | EB | F1 | C9 | F5 | 7C | E6 | 80 | CD | BA |
| 0DD | 0D | 84 | 67 | F1 | C9 | 7D | CD | CA | 0D | CD | CA | 0D | E6 | 03 | C9 | E6 |
| 0DE | 07 | 47 | AF | 37 | 17 | 05 | F2 | E4 | 0D | C9 | 50 | 20 | F1 | 04 | 50 | 20 |
| 0DF | 52 | 03 | 50 | 20 | 3A | 07 | 20 | 4E | E0 | B1 | 90 | E8 | 59 | FF | 40 | 9C |
| 0E0 | C0 | 63 | 20 | D1 | B3 | FE | 00 | 00 | 00 | 00 | 0E | 17 | 2D | 5A | 0F | 1C |
| 0E1 | 34 | 5F | 11 | 21 | 3C | 64 | 14 | 26 | 40 | 69 | 17 | 2B | 44 | 6E | 19 | 2E |
| 0E2 | 45 | 71 | 1C | 32 | 47 | 75 | 1E | 35 | 4D | 78 | 21 | 39 | 53 | 7B | 22 | 3C |
| 0E3 | 54 | 7C | 24 | 3F | 56 | 7E | 26 | 42 | 57 | 7E | 28 | 46 | 58 | 7F | 28 | 48 |
| 0E4 | 59 | 7F | 28 | 4B | 5A | 7F | 08 | 03 | 03 | 02 | 02 | 01 | 00 | | | |
| 0E5 | | | | | | | | | | | | | | | | |
| 0E6 | | | | | | | | | | | | | | | | |
| 0E7 | | | | | | | | | | | | | | | | |
| 0E8 | | | | | | | | | | | | | | | | |
| 0E9 | | | | | | | | | | | | | | | | |
| 0EA | | | | | | | | | | | | | | | | |
| 0EB | | | | | | | | | | | | | | | | |
| 0EC | | | | | | | | | | | | | | | | |
| 0ED | | | | | | | | | | | | | | | | |
| 0EE | | | | | | | | | | | | | | | | |
| 0EF | | | | | | | | | | | | | | | | |

TABLE 4

Y31 Cut-off Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | C3 | F2 | 01 | | | | | | | | | | | | | |
| 001 | | | | | | | | | | | | | | | | |
| 002 | | | | | 76 | | | | | | | | | | | |
| 003 | | | | | C3 | 3F | 00 | | C3 | E4 | 00 | | C3 | 7F | 01 | E5 |
| 004 | D5 | F5 | AF | D3 | C3 | DB | 80 | 5F | DB | 80 | 57 | DB | 40 | 6F | DB | 40 |
| 005 | 67 | DB | 33 | D3 | 3D | C5 | 47 | 3A | 0D | 22 | E6 | 10 | 78 | CA | 61 | 00 |
| 006 | 2F | E6 | 01 | CA | AD | 00 | 3A | 71 | 20 | B7 | CA | DE | 00 | 3D | 32 | 71 |
| 007 | 20 | FB | 7C | B7 | FA | 8B | 00 | B5 | CA | 8B | 00 | CD | 67 | 0A | EB | 2A |
| 008 | 6F | 20 | 19 | EB | 2A | 62 | 20 | 19 | DA | 8C | 00 | EB | 3A | 9F | 20 | B7 |
| 009 | C2 | A7 | 00 | EB | 2A | 15 | 22 | CD | FF | 09 | AF | B4 | C2 | D7 | 00 | 3A |
| 00A | 6E | 20 | 95 | FA | D7 | 00 | EB | 22 | 11 | 22 | C3 | DE | 00 | 3A | 71 | 20 |
| 00B | 47 | 3A | 72 | 20 | B8 | CA | DE | 00 | DA | DE | 00 | 3D | 32 | 72 | 20 | FB |
| 00C | CD | 67 | 0A | EB | 2A | 6F | 20 | 19 | EB | 2A | 62 | 20 | 19 | DA | D1 | 00 |
| 00D | EB | 22 | 13 | 22 | C3 | DE | 00 | 3A | 71 | 20 | 3C | 32 | 71 | 20 | C1 | F1 |
| 00E | D1 | E1 | FB | C9 | F5 | 3E | 04 | 32 | 03 | 23 | FB | C5 | D5 | E5 | 3A | 00 |
| 00F | 23 | 4F | 3A | 01 | 23 | 47 | 3A | 05 | 22 | B7 | C2 | 44 | 01 | 3A | 0D | 22 |
| 010 | E6 | 80 | C2 | 1B | 01 | 79 | 0F | 0F | 0F | 0F | E6 | 0F | 4F | 78 | 0F | 0F |
| 011 | 0F | 0F | 47 | E6 | F0 | 81 | 4F | 78 | E6 | 0F | 47 | AF | CD | 50 | 01 | 3A |
| 012 | 0D | 22 | E6 | 80 | C2 | 2E | 01 | EB | CD | 89 | 0A | C3 | 32 | 01 | CD | 8F |
| 013 | 0A | EB | 2A | 62 | 20 | 19 | CD | 5D | 0A | 22 | 09 | 22 | 22 | 15 | 22 | 3E |
| 014 | 01 | 32 | A0 | 20 | E1 | D1 | C1 | 3E | 05 | F3 | 32 | 03 | 23 | F1 | FB | C9 |
| 015 | 21 | 00 | 00 | 11 | 10 | 27 | CD | 6E | 01 | 78 | 11 | E8 | 03 | CD | 76 | 01 |
| 016 | 11 | 64 | 00 | CD | 6E | 01 | 79 | 1E | 0A | CD | 76 | 01 | 1E | 01 | FE | 00 |
| 017 | C8 | 19 | 3D | C3 | 6E | 01 | FE | 0A | D8 | 19 | D6 | 10 | C3 | 76 | 01 | F5 |
| 018 | D5 | E5 | 2A | 57 | 20 | 22 | 59 | 20 | CD | 2A | 09 | 22 | 57 | 20 | 20 | F6 |
| 019 | 4C | EE | 80 | 30 | FB | 2A | 59 | 20 | EB | 2A | 57 | 20 | CD | FF | 09 | 22 |
| 01A | 5D | 20 | 32 | 5F | 20 | CD | C1 | 01 | 22 | 0E | 22 | 3A | 56 | 20 | 3C | 32 |
| 01B | 56 | 20 | CD | 50 | 02 | 20 | E6 | 83 | F6 | 48 | F3 | 30 | E1 | D1 | F1 | FB |
| 01C | C9 | 11 | 00 | 00 | 2A | 5D | 20 | 3A | 0D | 22 | E6 | 80 | C2 | D4 | 01 | EB |
| 01D | 19 | 19 | 19 | C9 | EB | 19 | EB | CD | 8F | 0A | CD | 8F | 0A | CD | EB | 01 |
| 01E | CD | EB | 01 | CD | 8F | 0A | CD | EB | 01 | EB | C9 | CD | 8F | 0A | EB | 19 |
| 01F | EB | C9 | F3 | 31 | 50 | 20 | CD | 79 | 05 | 21 | 03 | 00 | 7D | 21 | 7A | 20 |
| 020 | 22 | 78 | 20 | EB | 21 | AF | 0A | 23 | 23 | 4E | 23 | 46 | 23 | EB | 23 | 71 |
| 021 | 23 | 70 | 23 | EB | 3D | C2 | 07 | 02 | CD | 9A | 05 | FB | C3 | 39 | 02 | 2A |
| 022 | 78 | 20 | 77 | FB | 23 | D1 | 73 | 23 | 72 | 2A | 78 | 20 | 23 | 23 | 23 | 22 |
| 023 | 78 | 20 | 23 | 7E | 23 | B6 | C2 | 3F | 02 | 21 | 7A | 20 | 22 | 78 | 20 | 2A |
| 024 | 78 | 20 | 7E | B7 | C2 | 29 | 02 | 23 | 31 | 50 | 20 | 5E | 23 | 56 | EB | E9 |
| 025 | E5 | F5 | 21 | 7A | 20 | 7E | B7 | F2 | 5B | 02 | 34 | 23 | 7E | 23 | B6 | 23 |
| 026 | C2 | 55 | 02 | F1 | E1 | C9 | 3A | 73 | 20 | 32 | 71 | 20 | 32 | 72 | 20 | CD |
| 027 | 32 | 03 | FA | 66 | 02 | DA | CC | 02 | C2 | D9 | 02 | C3 | B0 | 02 | CD | FB |
| 028 | 06 | 3E | 11 | CD | 45 | 05 | CD | 32 | 03 | FA | 8F | 02 | C3 | 97 | 02 | 3E |
| 029 | 01 | 32 | 9F | 20 | C3 | 86 | 02 | 2A | 11 | 22 | 22 | 15 | 22 | CD | D6 | 08 |
| 02A | 3E | 00 | 32 | 9F | 20 | 3E | 11 | CD | 4E | 05 | 2A | 11 | 22 | 22 | 09 | 22 |
| 02B | CD | 32 | 03 | FA | D3 | 02 | DA | CC | 02 | C2 | D9 | 02 | 3A | 9F | 20 | B7 |
| 02C | C2 | 7E | 02 | CD | 1A | 07 | CD | E0 | 06 | C3 | B0 | 02 | 3A | 9F | 20 | B7 |
| 02D | C2 | 7E | 02 | CD | FB | 06 | C3 | B0 | 02 | DB | 33 | E6 | 04 | C2 | E5 | 02 |
| 02E | D3 | 3A | C3 | D9 | 02 | CD | 32 | 03 | CA | 17 | 03 | FA | 17 | 03 | DA | 17 |
| 02F | 03 | CD | 1A | 07 | 32 | 08 | 22 | CD | 3E | 07 | CD | E0 | 06 | 47 | E6 | 7F |

TABLE 4 (CONTINUED)

Cut-off Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 030 | 4F | 3A | 52 | 20 | 81 | F2 | 09 | 03 | AF | 4F | 78 | E6 | 80 | B1 | 32 | 10 |
| 031 | 22 | CD | EA | 07 | C3 | E5 | 02 | AF | CD | EA | 07 | 3E | FD | CD | 1F | 02 |
| 032 | DB | 33 | E6 | 04 | CA | 2C | 03 | D3 | 3A | C3 | 20 | 03 | CD | FB | 06 | C3 |
| 033 | B0 | 02 | E1 | 22 | 91 | 20 | 3E | 7F | CD | 1F | 02 | 3A | 8A | 20 | B7 | 3A |
| 034 | 8B | 20 | 1F | 2A | 91 | 20 | E9 | 3E | FF | CD | 1F | 02 | CD | A7 | 06 | AF |
| 035 | 32 | 8A | 20 | 2A | 57 | 20 | EB | 2A | 62 | 20 | 2B | 19 | DA | 9A | 03 | 2A |
| 036 | 5D | 20 | 3A | 5F | 20 | B7 | C2 | 9A | 03 | EB | 2A | 64 | 20 | 19 | DA | 9A |
| 037 | 03 | 2A | 66 | 20 | 19 | 3E | 10 | DA | 85 | 03 | CD | 5F | 05 | 3E | 01 | 32 |
| 038 | 8D | 20 | C3 | 9A | 03 | CD | 68 | 05 | AF | 32 | 8D | 20 | 3A | 89 | 20 | B7 |
| 039 | CA | B2 | 03 | 3D | 32 | 89 | 20 | C3 | BC | 04 | CD | 18 | 09 | CD | DC | 04 |
| 03A | 2A | 74 | 20 | 36 | 00 | 3E | 20 | CD | 68 | 05 | 3E | 0A | 32 | 89 | 20 | C3 |
| 03B | BC | 04 | 3A | 9F | 20 | FE | 02 | C2 | E3 | 03 | 3A | 71 | 20 | B7 | C2 | CE |
| 03C | 03 | 2A | 74 | 20 | 36 | 00 | 3E | 01 | 32 | 8C | 20 | C3 | BC | 04 | 3A | 88 |
| 03D | 20 | 47 | 3A | 87 | 20 | 90 | FE | 05 | DA | BC | 04 | 3E | 01 | 32 | 9F | 20 |
| 03E | C3 | BC | 04 | 2A | 11 | 22 | EB | 2A | 57 | 20 | CD | FF | 09 | B7 | C2 | 8C |
| 03F | 04 | EB | 2A | 68 | 20 | CD | 67 | 0A | DA | 98 | 04 | 3A | 8C | 20 | B7 | CA |
| 040 | 05 | 04 | F2 | 98 | 04 | 3A | 9F | 20 | FE | 01 | CA | 48 | 04 | 3E | 01 | 32 |
| 041 | 8C | 20 | CD | D6 | 08 | 3A | 71 | 20 | B7 | C2 | 62 | 04 | 3A | 73 | 20 | 32 |
| 042 | 71 | 20 | 32 | 72 | 20 | 3A | A0 | 20 | FE | 02 | CA | 31 | 04 | AF | 32 | A0 |
| 043 | 20 | 2A | 74 | 20 | 36 | 00 | AF | 32 | 8B | 20 | 3E | 20 | CD | 68 | 05 | 2A |
| 044 | 11 | 22 | 22 | 15 | 22 | C3 | 9F | 04 | 3A | 73 | 20 | 32 | 71 | 20 | 32 | 72 |
| 045 | 20 | CD | 8B | 08 | 3E | 02 | 32 | 9F | 20 | 3A | 87 | 20 | 32 | 88 | 20 | C3 |
| 046 | BC | 04 | 3E | 01 | 32 | 8B | 20 | 3A | A0 | 20 | FE | 02 | C2 | 73 | 04 | 3D |
| 047 | 32 | A0 | 20 | 3E | 20 | CD | 5F | 05 | CD | E1 | 04 | 2A | 74 | 20 | 36 | 00 |
| 048 | 3A | 73 | 20 | 32 | 71 | 20 | 32 | 72 | 20 | C3 | BC | 04 | 3A | 8C | 20 | B7 |
| 049 | FA | 98 | 04 | 3E | FF | 32 | 8C | 20 | 3A | 8B | 20 | B7 | C2 | BC | 04 | 3E |
| 04A | 08 | CD | 68 | 05 | 3A | 8D | 20 | B7 | C2 | BC | 04 | 3A | 05 | 22 | B7 | CA |
| 04B | B7 | 04 | 3E | 01 | 32 | 8A | 20 | 3E | 02 | CD | 5F | 05 | 2A | 5B | 20 | EB |
| 04C | 2A | 57 | 20 | CD | FF | 09 | 47 | 3A | 86 | 20 | B8 | CA | 47 | 03 | 78 | 32 |
| 04D | 86 | 20 | 3A | 87 | 20 | 3C | 32 | 87 | 20 | C3 | 47 | 03 | 3E | FF | 32 | 8A |
| 04E | 20 | 3E | 02 | CD | 68 | 05 | 3E | 08 | CD | 5F | 05 | C9 | CD | 44 | 05 | 3E |
| 04F | FF | CD | 1F | 02 | 3A | 9E | 20 | 47 | 3A | 9D | 20 | 32 | 9E | 20 | A0 | 47 |
| 050 | DB | 2B | 32 | 9D | 20 | 2F | A0 | CA | 1E | 05 | 1F | DC | C0 | 09 | 1F | DC |
| 051 | BA | 09 | 1F | DC | 70 | 09 | 1F | DC | F3 | 09 | 1F | DC | 9F | 09 | 3A | A1 |
| 052 | 20 | 3D | FA | 41 | 05 | 32 | A1 | 20 | CA | 38 | 05 | FE | 19 | C2 | 41 | 05 |
| 053 | 3E | 0A | CD | 4E | 05 | C3 | 41 | 05 | 3A | 9D | 20 | 2F | E6 | 03 | C4 | C6 |
| 054 | 09 | C3 | EF | 04 | C9 | C5 | 47 | 3A | A4 | 20 | B0 | C3 | 55 | 05 | C5 | 2F |
| 055 | 47 | 3A | A4 | 20 | A0 | 32 | A4 | 20 | D3 | 31 | 32 | 06 | 24 | C1 | C9 | C5 |
| 056 | 47 | 3A | A5 | 20 | B0 | C3 | 6F | 05 | C5 | 2F | 47 | 3A | A5 | 20 | A0 | 32 |
| 057 | A5 | 20 | D3 | 31 | 32 | 05 | 24 | C1 | C9 | D1 | 21 | 00 | 20 | 01 | 00 | 02 |
| 058 | AF | 77 | 23 | 0B | 78 | B1 | C2 | 80 | 05 | 21 | 7A | 20 | 23 | 23 | 23 | 22 |
| 059 | 74 | 20 | 23 | 23 | 23 | 22 | 76 | 20 | EB | E9 | 3E | 19 | 30 | 3E | DA | D3 |
| 05A | 2C | 3E | 6F | D3 | 2D | 3E | C0 | D3 | 28 | DB | 29 | 32 | 0C | 22 | DB | 2A |
| 05B | 32 | 0D | 22 | DB | 2B | E6 | 20 | 32 | 6C | 20 | 3E | 03 | D3 | 30 | DB | 33 |
| 05C | E6 | 04 | CA | CA | 05 | D3 | 3A | C3 | BE | 05 | 3E | FF | CD | 4E | 05 | CD |
| 05D | 68 | 05 | 3A | 05 | 22 | FE | 01 | 3E | 01 | CA | E2 | 05 | AF | 32 | 05 | 22 |
| 05E | 3E | 04 | CD | 5F | 05 | 3E | BF | 32 | 03 | 23 | 3E | 05 | 32 | 03 | 23 | 2A |
| 05F | 0C | 22 | CD | 9A | 0A | CD | A4 | 0A | 32 | 50 | 20 | CD | 9A | 0A | 3C | CD |

TABLE 4 (CONTINUED)

Cut-off Control

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 060 | A4 | 0A | 32 | 51 | 20 | CD | 9A | 0A | CA | 10 | 06 | CD | A4 | 0A | 2F | 3C |
| 061 | 32 | 52 | 20 | CD | 9A | 0A | 3C | 32 | 53 | 20 | CD | 9A | 0A | 32 | 54 | 20 |
| 062 | CD | A4 | 0A | 3D | 32 | 55 | 20 | 21 | 60 | 20 | E5 | 3A | 0D | 22 | E6 | 80 |
| 063 | 21 | BB | 0A | CA | 39 | 06 | 21 | C3 | 0A | 06 | 04 | 5E | 23 | 56 | 23 | E3 |
| 064 | 73 | 23 | 72 | 23 | E3 | 05 | C2 | 3B | 06 | E1 | 3A | 0D | 22 | E6 | 40 | 21 |
| 065 | 3E | 00 | CA | 58 | 06 | 21 | 7C | 00 | 22 | 68 | 20 | 7D | 0F | 32 | 6D | 20 |
| 066 | 1F | 32 | 6E | 20 | 3E | 01 | 32 | 73 | 20 | CD | 18 | 09 | CD | 2A | 09 | 22 |
| 067 | 57 | 20 | 22 | 5B | 20 | 3E | 0A | CD | 99 | 06 | 3E | 14 | FB | 76 | 3D | C2 |
| 068 | 7D | 06 | F3 | DB | 30 | E6 | 40 | 3E | 01 | C2 | 8D | 06 | AF | 32 | 6B | 20 |
| 069 | AF | CD | 99 | 06 | 3E | 32 | D3 | 43 | C9 | D3 | 32 | D3 | 34 | AF | D3 | 35 |
| 06A | 3E | C3 | D3 | 30 | D3 | 3B | C9 | F5 | 3A | 6B | 20 | B7 | C2 | DE | 06 | 3E |
| 06B | 0A | CD | 4E | 05 | DB | 33 | E6 | 08 | C2 | C9 | 06 | 3A | 6C | 20 | B7 | 3E |
| 06C | 02 | C2 | C6 | 06 | 3E | 08 | CD | 45 | 05 | DB | 33 | E6 | 10 | C2 | DE | 06 |
| 06D | 3A | 6C | 20 | B7 | 3E | 08 | C2 | DB | 06 | 3E | 02 | CD | 45 | 05 | F1 | C9 |
| 06E | C5 | F5 | 47 | E6 | 7F | 4F | 3A | 51 | 20 | B9 | F4 | 03 | 07 | F2 | F8 | 06 |
| 06F | 78 | B7 | F4 | 09 | 07 | FC | 0F | 07 | F1 | C1 | C9 | F5 | 3E | 15 | CD | 4E |
| 070 | 05 | F1 | C9 | F5 | 3E | 04 | C3 | 12 | 07 | F5 | 3E | 01 | C3 | 12 | 07 | F5 |
| 071 | 3E | 10 | CD | FB | 06 | CD | 45 | 05 | F1 | C9 | E5 | D5 | 2A | 09 | 22 | EB |
| 072 | 2A | 11 | 22 | CD | FF | 09 | 11 | 81 | FF | 19 | D2 | 30 | 07 | 21 | 00 | 00 |
| 073 | 11 | 7F | 00 | 19 | B7 | CA | 3A | 07 | 3E | 80 | B5 | D1 | E1 | C9 | C5 | D5 |
| 074 | E5 | 4F | E6 | 7F | CA | 54 | 07 | 79 | E6 | 80 | 47 | 3A | 9C | 20 | E6 | 80 |
| 075 | A8 | C2 | A9 | 07 | 21 | 94 | 20 | 3A | 93 | 20 | 5F | 16 | 00 | 19 | 3C | 47 |
| 076 | 3A | 55 | 20 | A0 | 32 | 93 | 20 | 46 | 79 | E6 | 7F | 4F | 77 | 2A | 8F | 20 |
| 077 | EB | 68 | 26 | 00 | CD | 67 | 0A | 5F | 16 | 00 | 19 | 22 | 8F | 20 | 3A | 54 |
| 078 | 20 | 3D | FA | 8B | 07 | CD | 8F | 0A | C3 | 81 | 07 | 79 | BD | D2 | 91 | 07 |
| 079 | 6F | 7D | B7 | 06 | 01 | CA | 9A | 07 | 06 | 00 | 3A | 9C | 20 | E6 | 80 | B0 |
| 07A | 32 | 9C | 20 | E6 | 80 | B5 | C3 | E6 | 07 | 3A | 9C | 20 | EE | 80 | 32 | 9C |
| 07B | 20 | 79 | E6 | 7F | 5F | 16 | 00 | 21 | 94 | 20 | 3A | 55 | 20 | 73 | 23 | 3D |
| 07C | F2 | BD | 07 | 3A | 55 | 20 | 21 | 00 | 00 | 19 | 3D | F2 | C9 | 07 | 22 | 8F |
| 07D | 20 | 3A | 9C | 20 | E6 | 01 | 79 | C2 | DC | 07 | E6 | 80 | 6F | 3A | 9C | 20 |
| 07E | E6 | 80 | 32 | 9C | 20 | 7D | E1 | D1 | C1 | C9 | E5 | D5 | C5 | F5 | 47 | 3A |
| 07F | 6B | 20 | B7 | CA | 11 | 08 | 78 | E6 | 7F | C2 | 04 | 08 | 3E | 0A | CD | 4E |
| 080 | 05 | C3 | 11 | 08 | 78 | E6 | 80 | 3E | 02 | CA | 0E | 08 | 3E | 08 | CD | 45 |
| 081 | 05 | 3A | 6C | 20 | B7 | CA | 1C | 08 | 78 | EE | 80 | 47 | 2A | 0E | 22 | AF |
| 082 | EB | 21 | 32 | 00 | CD | 67 | 0A | DA | 30 | 08 | 3C | FE | 0F | DA | 20 | 08 |
| 083 | 07 | 07 | 4F | 3A | 53 | 20 | 3D | 81 | 5F | 16 | 00 | 21 | CB | 0A | 19 | 4E |
| 084 | 78 | E6 | 7F | CA | 5D | 08 | FE | 06 | FA | 4D | 08 | 3E | 06 | 5F | 21 | 0B |
| 085 | 08 | 19 | 5E | 79 | C3 | 59 | 08 | B7 | 1F | 1D | F2 | 57 | 08 | 4F | 78 | E6 |
| 086 | 80 | B1 | D3 | 32 | 78 | E6 | 7F | CA | 86 | 08 | 5F | 16 | 00 | 3A | 53 | 20 |
| 087 | 21 | 00 | 00 | 19 | 3D | C2 | 73 | 08 | 7D | D3 | 34 | 7C | F6 | 80 | D3 | 35 |
| 088 | 3E | C3 | D3 | 30 | D3 | 3B | F1 | C1 | D1 | E1 | C9 | E5 | D5 | C5 | F5 | 3A |
| 089 | 6A | 20 | B7 | 3E | 01 | 32 | 6A | 20 | C2 | C7 | 08 | 3E | B2 | D3 | 83 | 2A |
| 08A | 60 | 20 | 7D | D3 | 82 | 7C | D3 | 82 | 2A | 11 | 22 | EB | F3 | CD | 54 | 09 |
| 08B | CD | 2A | 09 | CD | 34 | 09 | EB | 2A | 68 | 20 | 19 | 22 | 6F | 20 | 7D | D3 |
| 08C | 40 | 7C | D3 | 40 | C3 | CE | 08 | DB | 33 | E6 | 20 | CA | D1 | 08 | D3 | 3C |
| 08D | FB | F1 | C1 | D1 | E1 | C9 | E5 | D5 | C5 | F5 | 3E | B2 | D3 | 83 | 2A | 68 |
| 08E | 20 | 7D | D3 | 82 | 7C | D3 | 82 | 2A | 11 | 22 | 3A | A0 | 20 | B7 | CA | F8 |
| 08F | 08 | 2A | 09 | 22 | 3C | 32 | A0 | 20 | F3 | EB | CD | 54 | 09 | CD | 2A | 09 |

TABLE 4 (CONTINUED)

Y31 Cut-off Control PAGE 04

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 090 | CD | 34 | 09 | 22 | 6F | 20 | 7D | D3 | 40 | 7C | D3 | 40 | D3 | 3C | AF | 32 |
| 091 | 6A | 20 | FB | F1 | C1 | D1 | E1 | C9 | F5 | E5 | 3E | 3A | D3 | 83 | 2A | 60 |
| 092 | 20 | 7D | D3 | 80 | 7C | D3 | 80 | E1 | F1 | C9 | AF | D3 | 83 | DB | 80 | 6F |
| 093 | DB | 80 | 67 | C9 | CD | FF | 09 | B7 | CA | 43 | 09 | CD | 5D | 0A | EB | 2A |
| 094 | 60 | 20 | 19 | EB | 2A | 6D | 20 | 26 | 00 | 19 | CD | 5D | 0A | EB | 2A | 60 |
| 095 | 20 | 19 | 09 | C9 | 2A | 5D | 20 | 4C | 06 | 00 | CD | 8F | 0A | CD | 8F | 0A |
| 096 | CD | 8F | 0A | CD | 8F | 0A | CD | 8F | 0A | 09 | CD | 5D | 0A | 44 | 4D | C9 |
| 097 | F5 | 3E | 05 | CD | 68 | 05 | 3A | 05 | 22 | B7 | 3A | 07 | 22 | CA | 8E | 09 |
| 098 | E6 | 03 | 32 | 07 | 22 | AF | 32 | 05 | 22 | 3E | 04 | C3 | 9A | 09 | F6 | 04 |
| 099 | 32 | 07 | 22 | 3E | 01 | 32 | 05 | 22 | 3E | 01 | CD | 5F | 05 | F1 | C9 | F5 |
| 09A | 3A | 05 | 22 | B7 | C2 | B8 | 09 | 3A | 9F | 20 | B7 | C2 | B8 | 09 | 3E | 01 |
| 09B | 32 | 9F | 20 | 2A | 74 | 20 | 36 | 00 | F1 | C9 | 21 | 08 | 00 | C3 | C3 | 09 |
| 09C | 21 | 02 | 01 | 22 | A2 | 20 | F5 | 3A | 05 | 22 | B7 | CA | F1 | 09 | 2A | A2 |
| 09D | 20 | 3E | 0A | CD | 4E | 05 | 7D | CD | 45 | 05 | 7C | 2A | 09 | 22 | EB | 2A |
| 09E | 50 | 20 | 26 | 00 | CD | 2C | 0A | F3 | 22 | 09 | 22 | FB | 3E | 32 | 32 | A1 |
| 09F | 20 | F1 | C9 | 3A | 05 | 22 | B7 | C0 | 2A | 11 | 22 | 22 | 09 | 22 | C9 | C5 |
| 0A0 | D5 | E5 | CD | 67 | 0A | D2 | 0D | 0A | EB | 2A | 60 | 20 | 19 | 4D | 44 | D1 |
| 0A1 | E1 | E5 | CD | 67 | 0A | D2 | 1D | 0A | EB | 2A | 60 | 20 | 19 | 59 | 50 | CD |
| 0A2 | 72 | 0A | 3E | 01 | DA | 29 | 0A | EB | AF | D1 | C1 | C9 | D5 | F5 | B7 | C2 |
| 0A3 | 43 | 0A | CD | 67 | 0A | CD | 72 | 0A | DA | 40 | 0A | EB | 2A | 60 | 20 | 19 |
| 0A4 | F1 | D1 | C9 | 19 | CD | 72 | 0A | DA | 55 | 0A | EB | 2A | 60 | 20 | CD | 72 |
| 0A5 | 0A | EB | D2 | 5A | 0A | EB | 2A | 62 | 20 | 19 | F1 | D1 | C9 | F5 | 7D | 2F |
| 0A6 | 6F | 7C | 2F | 67 | 23 | F1 | C9 | C5 | 47 | 7B | 95 | 6F | 7A | 9C | 67 | 78 |
| 0A7 | C1 | C9 | C5 | 47 | 7D | 93 | 7C | 9A | 78 | C1 | C9 | F5 | 29 | F1 | C9 | F5 |
| 0A8 | B7 | 7C | 1F | 67 | 7D | 1F | 6F | F1 | C9 | F5 | EB | 29 | EB | F1 | C9 | F5 |
| 0A9 | 7C | E6 | 80 | CD | 7F | 0A | 84 | 67 | F1 | C9 | 7D | CD | 8F | 0A | CD | 8F |
| 0AA | 0A | E6 | 03 | C9 | E6 | 07 | 47 | AF | 37 | 17 | 05 | F2 | A9 | 0A | C9 | 50 |
| 0AB | 20 | 47 | 03 | 50 | 20 | 66 | 02 | 50 | 20 | EC | 04 | D0 | 07 | 30 | F8 | A8 |
| 0AC | FD | EF | FF | 88 | 13 | 78 | EC | 24 | FA | D6 | FF | 00 | 00 | 00 | 00 | 0E |
| 0AD | 17 | 2D | 5A | 0F | 1C | 34 | 5F | 11 | 21 | 3C | 64 | 14 | 26 | 40 | 69 | 17 |
| 0AE | 2B | 44 | 6E | 19 | 2E | 45 | 71 | 1C | 32 | 47 | 75 | 1E | 35 | 4D | 78 | 21 |
| 0AF | 39 | 53 | 7B | 22 | 3C | 54 | 7C | 24 | 3F | 56 | 7E | 26 | 42 | 57 | 7E | 28 |
| 0B0 | 46 | 58 | 7F | 28 | 48 | 59 | 7F | 28 | 4B | 5A | 7F | 08 | 03 | 03 | 02 | 02 |
| 0B1 | 01 | 00 | | | | | | | | | | | | | | |
| 0B2 | | | | | | | | | | | | | | | | |
| 0B3 | | | | | | | | | | | | | | | | |
| 0B4 | | | | | | | | | | | | | | | | |
| 0B5 | | | | | | | | | | | | | | | | |
| 0B6 | | | | | | | | | | | | | | | | |
| 0B7 | | | | | | | | | | | | | | | | |
| 0B8 | | | | | | | | | | | | | | | | |
| 0B9 | | | | | | | | | | | | | | | | |
| 0BA | | | | | | | | | | | | | | | | |
| 0BB | | | | | | | | | | | | | | | | |
| 0BC | | | | | | | | | | | | | | | | |
| 0BD | | | | | | | | | | | | | | | | |
| 0BE | | | | | | | | | | | | | | | | |
| 0BF | | | | | | | | | | | | | | | | |

What is claimed is:

1. A method for job recovery for a copying system in which duplex copies are normally generated by initially sequentially feeding copy sheets to a copying area for copying on one side of said sheets, storing said sheets in a duplex tray after copying has occurred on said one side, feeding said copy sheets in said duplex tray to said copying area for copying on the other side of said sheets, and then collecting said sheets twice fed through said copying area at an exit station, said method comprising:

maintaining a count of copy sheets in said duplex tray and a count of copy sheets at said exit station;

determining upon occurrence of predetermined copy sheet failure during copying on said other side of said copy sheets, at least in part from said counts, copies lost due to said failure; and utilizing said determination of copies lost to generate replacement copies prior to continuing normal duplex copy generation after said copy sheet failure has occurred.

2. The method of claim 1 wherein said copying system is included in a printer having electrical signals representative of images presented at said copying area so that images are printed on one side of said copy sheets during a first pass of said sheets through said copying area and printed on the opposite side of said copy sheets during a second pass through said copying area to achieve normal copy generation, and wherein upon occurrence of said copy sheet failure, images lost are determined and replacements printed.

3. The method of claim 1 wherein said predetermined copy sheet failure is due to copy sheet jams, wherein said method includes providing a count of total pages in each set of material to be copied, and wherein said determination of copies lost is made by dividing by two said total number of pages in said set of material and subtracting therefrom the number of copy sheets in said duplex tray and the number of copy sheets at said exit station.

4. The method of claim 1 wherein said generated replacement copies are placed in said duplex tray prior to continuation of normal copy generation after said copy sheet failure has occurred during second side copying of said copy sheets.

5. The method of claim 1 wherein said method includes maintaining a count of copy sheets fed to said copying area, and utilizing the same to determine completion of copy sets.

6. The method of claim 1 wherein said method includes interrupting copy generation for a predetermined job while maintaining necessary count information with regard to said job whereby said job can be completed after termination of said interruption.

7. The method of claim 1 wherein said method includes providing for recover purposes a total count of sides of copy sheets exposed for copying at said copying area.

8. The method of claim 7 wherein said total count of sides of copy sheets is determined by maintaining a count of said copy sheets fed to said duplex tray and a count of said copy sheets received at said exit station.

9. A method for generating duplex copies by sets of a plurality of images without loss of copies due to copy material jams occurring during copy generation, said method comprising:

sequentially providing to a copying area at least a representation of each image of a set to be copied;

providing dual-sided copy material to said copying area with said copy material being capable of having an image copied on each side thereof;

causing the image then being represented at said copying area to be copied on a predetermined first storing said copy material having an image on said first side thereof in a duplex tray;

maintaining a count of copy material in said duplex tray;

causing said copy material to be withdrawn from said duplex tray and fed to said copying area for copying on the second side thereof of a different image represented at said copying area;

moving said copy material twice fed to said copying area to an exit station;

maintaining a count of copy material received at said exit station;

interrupting copy generation whenever a jam occurs with respect to second side copying of said copy material;

utilizing said counts to determine copied images lost from each side of copy material involved in said jam;

representing at said copying area the representation of images determined to have been lost due to said jam to cause new copies to be made thereof; and continuing copy generation after said new copies have been made of lost images to thereby provide a complete set of duplex copies.

10. The method of claim 9 wherein said method includes placing said new copies in said duplex tray when said new copies are made to replace copies lost due to a jam of said copy material that occurs during said second side copying.

11. The method of claim 9 wherein said method also includes providing a count of total pages in a set of images to be copied, dividing said count of total pages by two and then subtracting therefrom said count of copy material in said duplex tray and said count of copy material received at said exit station.

12. The method of claim 9 wherein said dual-sided copy material includes a plurality of discrete copy sheets, and wherein said method also includes providing a count of said copy sheets fed to said copying area for determination of completion of each set of copies being generated.

13. A method for printing images of both sides of each of a plurality of recording media in response to received electrical signals representative of said images without loss of printed images due to jams occurring with respect to said recording media, said method comprising:

providing first and second pluralities of electrical signals representative of first and second groups of images, respectively;

presenting said first plurality of electrical signals at a printing area to thereby cause said first group of images to be printed on one side of said recording media;

storing said recording media with said images on one side thereof in a duplex tray;

maintaining a count of recording media in said duplex tray;

presenting said second plurality of electrical signals at said printing area along with said recording media withdrawn from said duplex tray to thereby cause said second group of images to be printed on the other side of said recording media;

passing said recording media having been twice presented at said printing area to an exit pocket;

maintaining a count of recording media passed to said exit pocket;

interrupting said printing of said images on said other side of recording media when a jam occurs with respect to said recording media;

utilizing said counts to determine printed images of both said first and second groups of images lost due to said jam;

representing at said printing area said first electrical signals representative of said first group of images determined to have been lost due to said jam to thereby print new images thereof on said recording media;

storing said recording media with said newly printed images printed thereon in said duplex tray;

representing at said printing area said several electrical signals representative of said second group of images determined to have been lost due to said jam and withdrawing said recording media having said newly printed images thereon from said duplex tray to thereby print new images of said lost images on said other side of said recording media; and thereafter continuing printing of said second group of images.

14. A system for printing duplex copies without loss due to predetermined copy sheet failure, said system comprising:

printing means for printing images on copy sheets at a printing area;

storage means for storing copy sheets;

a duplex tray;

means for causing movement of said copy sheets in a copy sheet path from said storage receptacle through said printing area to said duplex tray and from said duplex tray through said printing area to an exit station;

first sensor means for maintaining a count of copy sheets in said duplex tray;

second sensor means for maintaining a count of copy sheets received at said exit station; and processing means connected with said first and second sensor means to determine copy sheets lost due to jams occurring during normal printing of duplex copies and for causing replacement copies to be printed prior to resumption of normal copy printing including generating replacement copies when copy sheets are lost during copying on sheets withdrawn from said duplex tray.

15. The system of claim 14 wherein said processing means includes means for determining said replacement copies needed, R, according to the formula $$R=TP/2-C_T-C_E$$

where TP is the total pages in the set to be printed, $C_T$ is the count of pages in the duplex tray, and $C_E$ is the count of copy sheets at said exit station.

16. The system of claim 14 wherein said system includes third sensor means for maintaining a count of copy sheets withdrawn from said storage receptacle and said duplex tray for determining completion of copied sets.

17. The system of claim 16 wherein said system includes a register for maintaining a count of the number of sets copied.

18. The system of claim 14 wherein said system includes a register for maintaining a count of the number of pages per set to be copied.

19. The system of claim 14 wherein said system includes an interrupt switch for interrupting printing of said duplex copies, and wherein said processing means includes means for continuing copy printing to completion after said interruption has been terminated.

20. A system for effecting job recovery in a copying device having a storage receptacle for storing copy sheets, a duplex tray for storing copy sheets with one side having copy thereon, and means establishing a path for said copy sheets from said storage receptacle through a copying area to said duplex tray and from said duplex tray through said copying area to a copy sheet exit station, said system comprising:

first means for determining the number of copy sheets withdrawn from said storage receptacle and said duplex tray;

second means for determining the number of copy sheets in said duplex tray;

third means for determining the number of copy sheets received at said copy sheet exit station; and means connected with said first, second and third determining means and responsive thereto for causing interruption of normal copying by said copying device to generate replacement copies due to copy sheet losses occurring during a jam while copying on copy sheets withdrawn from said duplex tray with resumption of said normal copying occurring after said replacement copies have been generated.

* * * * *

UNITED STATES PATENT AND TRADEMARK OFFICE

CERTIFICATE OF CORRECTION

PATENT NO. : 4,317,629

DATED : March 2, 1982

INVENTOR(S) : Roger E. Kuseski

It is certified that error appears in the above—identified patent and that said Letters Patent is hereby corrected as shown below:

Column 4, line 58, delete "the" and insert --then--.

Delete Tables 3 and 4 in their entirety and insert Appendixes A and B, attached.

Claim 9, line 3, after "first" insert --side of said copy material;--.

| INSTRUCTION MNEMONIC | HEX VALUE | NAME | DESCRIPTION |
|---|---|---|---|
| AB(L) | A4 | Add Byte (Low) | Adds addressed operand to LACC (8-bit op.) |
| AI(L) | AC | Add Immed. (Low) | Adds address field to LACC (16-bit op.) |
| AR | DN | Add Reg. | Adds N-th register contents to ACC (16-bit op.) |
| A1 | 2E | Add One | Adds 1 to ACC (16-bit op.) |
| B | 24,28,2C | Branch | Branch to LSB (+256,-256,+0) |
| BAL | 30-33 | Branch And Link | Used to call subroutines (PC to Reg. 0, 1, 2, or 3) |
| BE | 35,39,3D | Branch Equal | Branches if EQ set (See B) |
| BH | 36,3A,3E | Branch High | Branch if EQ and LO are reset (See B) |
| BNE | 34,38,3C | Branch Not Equal | Branch if EQ reset (See B) |
| BNL | 37,3B,3F | Branch Not Low | Branch if LO reset (See B) |
| BR | 20-23 | Branch Reg. | See RTN |
| CB(L) | A0 | Compare Byte (Low) | Addressed byte compared to LACC (8-bit op.) |
| CI(L) | A8 | Compare Immed. (Low) | Address field compared to LACC (8-bit op.) |
| CLA | 25 | Clear Acc. | ACC reset to all zeroes (16-bit op.) |
| GI | A9 | Group Immed. | Selects one of 16 register groups (also controls interrupts) |
| IC | 2D | Input Carry | Generate carry into ALU |
| IN | 26 | Input | Read into LACC from addressed device (8-bit op.) |
| J | 0N,1N | Jump | Jump (forward or back) to PC(15-4),N |
| JE | 4N,5N | Jump Equal | Jump if EQ set (See J) |
| JNE | 6N,7N | Jump Not Equal | Jump if EQ reset (See J) |
| LB(L) | A6 | Load Byte (L) | Load addressed byte into LACC (8-bit op.) |
| LI | AE | Load Immed. | Load address field into LACC |
| LN | 98-9F | Load Indirect | Load byte addressed by reg. 8-F into LACC (8-bit op.) |
| LR | EN | Load Register | Load register N into ACC (16-bit op.) |
| LRB | FN | Load Reg./ Bump | Load reg. N into ACC and increment; ACC to Reg. N (N=4-7,C-F) (16-bit op.) |

| NSTRUCTION MNEMONIC | HEX VALUE | NAME | DESCRIPTION |
|---|---|---|---|
| LRD | FN | Load Reg./Decr. | Load reg. N into ACC and decrement; ACC to Reg. N (N=0-3,8-B) (16-bit op.) |
| NB(L) | A3 | And Byte (Low) | AND addressed byte into LACC (8-bit op.) |
| NI(L) | AB | And Immed.(Low) | AND address field into LACC (8-bit op.) |
| OB(L) | A7 | Or Byte (Low) | OR addressed byte into LACC (8-bit op.) |
| OI(L) | AF | Or Immed.(Low) | OR address field into LACC (8-bit op.) |
| OUT | 27 | Output | Write LACC to addressed device |
| RTN | 20-23 | Return | Used to return to calling program (See BAL) |
| SB(L) | A2 | Subtract Byte (Low) | Subtract addressed byte from LACC (8-bit op.) |
| SHL | 2B | Shift Left | Shift ACC one bit left (16-bit op.) |
| SHR | 2F | Shift Right | Shift ACC one bit right (16-bit op.) |
| SI(L) | AA | Subtract Immed.(Low) | Subtract address field from LACC (16-bit op.) |
| SR | CN | Subtract Reg. | Subtract reg. N from ACC (16-bit op.) |
| STB(L) | A1 | Store Byte(Low) | Store LACC at address (8-bit op.) |
| STN | B8-BF | Store Indirect | Store LACC at address in Reg. 8-F |
| STR | 8N | Store Reg | Store ACC in Reg. N (16-bit op.) |
| S1 | 2A | Subtract One | Subtract 1 from ACC (16-bit op.) |
| TP | 9N | Test/Preserve | Test N-th bit in LACC (N=0-7) |
| TR | BN | Test/Reset | Test and reset N-th bit in LACC |
| TRA | 29 | Transpose | Interchange HACC and LACC |
| XB(L) | A5 | XOR Byte (Low) | Exclusive-OR addressed byte into LACC (8-bit op.) |
| XI(L) | AD | XOR Immed. (Low) | Exclusive-OR address field into LACC (8-bit op.) |

Notes: ACC (Accumulator) is 16-bit output register from arithmetic-logic unit

- LACC signifies herein the low ACC byte; HACC, the high byte
  - all single byte operations are into low byte
  - register operations are 16-bit (two-byte)
- 8-bit operations do not affect HACC EQ (equal) is a flag which is set:

if ACC=0 after register AND or XOR operations;
if ACC (low byte)=0 after single byte operation;
if a tested bit is 0;
if bits set by OR were all 0's;
if input carry = 0;
if compare operands are equal;
if bit shifted out of ACC = 0;
if 8th bit of data during IN or OUT = 0.

LO (low) is a flag which is set: (always reset by IN, OUT, IC)

if ACC bit 16=1 after register operation;
if ACC bit 8=1 after single byte operations;
if logic operation produces all ones in LACC;
if all bits other than tested bit = 0;
if ACC=0 after shift operation;
if compare operand is greater than ACC low byte.

| MACRO NEMONIC | NAME | DESCRIPTION |
|---|---|---|
| BC | Branch on Carry | Branches if carry is set |
| BCT | Branch on Count | Reg. decremented and branch if not zero result |
| BHA | Branch on High ACC | Used after compare |
| BL | Branch on Low | Branches if LO is set |
| BLA | Branch on Low ACC | See BNC; used after compare |
| BNC | Branch Not Carry | Branches if carry is reset |
| BNLA | Branch on Not Low ACC | See BC; used after compare |
| BNZ | Branch Not Zero | Branches if previous result was not zero |
| BR | Branch via Register | Same as RTN instruction |
| BU | Branch Unconditionally | Same as BAL instruction |
| CIL | Compare Immed. Low | Uses low byte of indicated constant in CI address field |
| DC | Define Constant | Reserves space for constant |
| EXP2 | Express In powers of 2 | Opcode set to binary |
| JC | Jump on Carry | See BC |
| JL | Jump on Low | See BL |
| JNC | Jump on No Carry | See BNC |
| JNH | Jump Not High | See BNH |
| LA | Load Address | Generates sequence LIH, TRA, LIL |
| LBD | Load Byte Double | Bytes at addr. and addr. +1 to ACC |
| LID | Load Immed. Double | Same as LA |
| LIH | Load Immed. High | Uses high byte of constant in LI address field |
| LIL | Load Immed. Low | Uses low byte of constant in LI address field |
| NOP | No Operation | Dummy instruction - skipped |
| RAL | Rotate ACC Left | Generates sequence SHL, IC, A1 |
| SCTI | Set Count Immed. | Generates CLA, LI, STR |
| SHLM | Shift Left Multiple | Shifts specified number of times to left |
| SHRM | Shift Right Multiple | Shifts specified number of times to right |
| SRG | Set Register Group | Same as GI |
| STDB | Store Byte Double | ACC to addr. +1 and addr. |

| MACRO MNEMONIC | NAME | DESCRIPTION |
|---|---|---|
| TPB | Test & Preserve Bit | Generates sequence LB, TP |
| TRB | Test & Reset Bit | Generates sequence LB, TR, STB |
| TRMB | Test & Reset Multiple Bits | Same as TRB but specifies multiple bits |
| TRMR | Test/Reset Mult. Bits in Reg. | Generates LR, NI, STR |
| TS | Test and Set | Same as OI instruction |
| TSB | Test & Set Byte | Same as TS but byte is specified in addition to bit |
| TSMB | Test & Set Multiple Bytes | Same as TS but specifies multiple Bits |
| TSMR | Test & Set Mult. Bits in Reg. | Generates LR, OI, STR |
| LZI | Zero & Load Immed. | Generates CLA, LI |

NOTES: (Label) DC * causes the present location (*) to be associated with the label.

L and H, in general, are suffixes indicating low or high byte when 16 bit operands are addressed.

APPENDIX B

| ADDR | INSTR | OP1 | OP2 | LABEL | MNEMONIC INSTR | |
|---|---|---|---|---|---|---|
| . . . | | | | | | |
| 7FD6 | A628 | 0228 | | | LBL | STAT4 |
| 7FD8 | 94 | 0004 | | | TP | SICE2 |
| 7FD9 | 43 | 7FE3 | | | JE | DRUMEND |
| 7FDA | E9 | 0009 | | | LR | BR2 |
| 7FDB | 94 | 0004 | | | TP | PRINTD |
| 7FDC | 43 | 7FE3 | | | JE | DRUMEND |
| 7FDD | F3 | 0003 | | | LRD | TRAY# |
| 7FDE | 03 | 7FE3 | | | J | DRUMEND |
| . . . | | | | | | |
| 9CBF | E9 | 0009 | | | LR | BR2 |
| 9CC0 | 94 | 0004 | | | TP | PRINTD |
| 9CC1 | 64 | 9CC4 | | | JNE | ERROR1 |
| 9CC2 | 25 | | | | CLA | |
| 9CC3 | 04 | 9CD4 | | | J | ERROR2 |
| | | | | ERROR1 | LA | $IGNUMBR |
| 9CC4 | AE04 | 0466 | | | | |
| 9CC6 | 29 | | | | | |
| 9CC7 | AE66 | 0466 | | | | |
| 9CC9 | 8C | 000C | | | STR | CUTPRO |
| 9CCA | 2E | | | | A1 | |
| 9CCB | 8D | 000D | | | STR | INPRO |
| 9CCC | 9C | 000C | | | LN | CUTPRO |
| 9CCD | 29 | | | | TRA | |
| 9CCE | 9D | 000D | | | LN | INPRO |
| 9CCF | 2F | | | | SHR | |
| 9CD0 | C3 | 0003 | | | SR | TRAY# |
| | | | | | SRG | GROUPEX2 |
| 9CD1 | A9D2 | 00D2 | | | | |
| 9CD3 | CE | 000E | | | SR | EXIT# |
| | | | | ERROR2 | SRG | GROUPEX2 |
| 9CD4 | A9D2 | 00D2 | | | | |
| 9CD6 | 85 | 0005 | | | STR | REMAKE# |
| . . . | | | | | | |

| ADDR | INSTR | OP1 | OP2 | LABLE | MNEMONIC | INSTR |
|---|---|---|---|---|---|---|
| 9D0A | A9DB | 00D8 | | | | |
| 9D0C | 25 | | | | CLA | |
| 9D0D | 330000 | 0003 | 0000 | | BAL | THREE,<br>ORGRW |
| 9D10 | AE01 | 0001 | | | LI | REWIND1 |
| 9D12 | 330000 | 0003 | 0000 | | BAL | THREE,<br>ORGRW |
| | | | | | SRG | SCT/32 |
| 9D15 | A9C5 | 00C5 | | | | |
| 9D17 | A6B7 | 00B7 | | | LBL | SCT+16+<br>PORTPC |
| 9D19 | A80F | 000F | | | N1 | 15 |
| 9D1B | A1B7 | 00B7 | | | STBL | SCT+16+<br>PORTPC |
| | | | | | SRG | GROUPPR |
| 9D1D | A9D0 | 00D0 | | | | |
| | | | | | TSMR | BR4,<br>P(SVCA) |
| 9D1F | E8 | 0008 | | | | |
| 9D20 | AF04 | 0004 | | | | |
| 9D22 | 88 | 0008 | | | | |
| 9D23 | 3280A0 | 0002 | A080 | | BAL | PPINTR,<br>ORGCR |
| | | | | | TRMR | BR4,<br>P(SVCA) |
| 9D26 | E8 | 0008 | | | | |
| 9D27 | B2 | 0002 | | | | |
| 9D28 | 88 | 0008 | | | | |
| | | | | | SRG | GROUPEX2 |
| 9D29 | A9D2 | 0002 | | | | |
| 9D2B | E3 | 0003 | | | LR | SKIP1ST# |
| | | | | | SRG | GROUPPR |
| 9D2C | A9D0 | 00D0 | | | | |
| 9D2E | BE | 000E | | | STR | SKIPNUMB |
| 9D2F | DE | 000E | | | AR | SKIPNUMB |
| 9D30 | 60 | 9D40 | | | JNE | ERROR11 |

| ADDR | INSTR | OP1 | OP2 | LABEL | MNEMONIC INSTR | |
|---|---|---|---|---|---|---|
| . . . | | | | | | |
| 9D40 | A695 | 0295 | | ERROR11 | LBL | ENDFILL |
| 9D42 | 29 | | | | TRA | |
| 9D43 | AE06 | 0006 | | | LI | AD1 |
| 9D45 | 8F | 000F | | | STR | UNITS |
| 9D46 | 9F | 000F | | | LN | UNITS |
| 9D47 | A495 | 0295 | | | ABL | ENDFILL |
| 9D49 | A195 | 0295 | | | STBL | ENDFILL |
| 9D4B | A199 | 0299 | | | STBL | ENDPRINT |
| 9D4D | A098 | 0298 | | | CBL | ENDPAGE |
| 9D4F | 3F53 | 9D53 | | | BNL | ERROR13 |
| 9D51 | 2C6B | 9D6B | | | B | ERROR15 |
| 9D53 | A298 | 0298 | | ERROR13 | SBL | ENDPAGE |
| 9D55 | A497 | 0297 | | | ABL | BEGPAGE |
| 9D57 | A195 | 0295 | | | STBL | ENDFILL |
| 9D59 | A199 | 0299 | | | STBL | ENDPRINT |
| | | | | | TSMR | BR4, |
| | | | | | | P(SVCA) |
| 9D5B | E8 | 0008 | | | | |
| 9D5C | AF04 | 0004 | | | | |
| 9D5E | 88 | 0008 | | | | |
| | | | | | SRG | GROUPPC |
| 9D5F | A9D1 | 00D1 | | | | |
| | | | | | PPSVC | PC |
| | | | | | LI | $CA1038+ |
| | | | | | | $CA2038+ |
| | | | | | | $CA3038+ |
| | | | | | | $CA4038+ |
| | | | | | | $CA5038+ |
| | | | | | | $CA6038+ |
| | | | | | | $CA7038+ |
| 9D61 | AE38 | 0038 | | | | $CA8038 |
| 9D63 | 302364 | 0000 | 6423 | | BAL | 0,SUPERPC |
| | | | | | SRG | GROUPPR |
| 9D66 | A9D0 | 00D0 | | | | |

| ADDR | INSTR | OP1 | OP2 | LABEL | MNEMONIC INSTR | |
|---|---|---|---|---|---|---|
| | | | | | TRMR | BR4, |
| | | | | | | P(SVCA) |
| 9D68 | E8 | 0008 | | | | |
| 9D69 | B2 | 0002 | | | | |
| 9D6A | 88 | 0008 | | | | |
| 9D6B | EE | 000E | | ERROR15 | LR | SKIPNUMB |
| 9D6C | 2A | | | | S1 | |
| 9D6D | 8E | 000E | | | STR | SKIPNUMB |
| 9D6E | 3C40 | 9D40 | | | BNE | ERROR11 |
| . . . | | | | | | |
| 9E21 | EF | 000F | | MOVE3 | LR | UNITS |
| 9E22 | AE06 | 0006 | | | LI | AD1 |
| 9E24 | 8E | 000F | | | STR | UNITS |
| 9E25 | 9F | 000F | | | LN | UNITS |
| 9E26 | A495 | 0295 | | | ABL | ENDFILL |
| 9E28 | A098 | 0298 | | | CBL | ENDPAGE |
| 9E2A | 3F30 | 9E30 | | | BNL | MOVE6 |
| 9E2C | A195 | 0295 | | MOVE4 | STBL | ENDFILL |
| 9E2E | 2422 | 9F22 | | | B | MOVEEND |
| 9E30 | A298 | 0298 | | MOVE6 | SBL | ENDPAGE |
| 9E32 | A497 | 0297 | | | ABL | BEGPAGE |
| 9E34 | 1C | 9E2C | | | J | MOVE4 |
| | | | | MOVE8 | SRG | GROUPEX2 |
| 9E35 | A9D2 | 00D2 | | | | |
| 9E37 | B5 | 0005 | | | LR | REMAKE# |
| 9E38 | D5 | 0005 | | | AR | REMAKE# |
| 9E39 | 65 | 9E45 | | | JNE | MOVE9 |
| 9E3A | E9 | 0009 | | | LR | SKIP2NC# |
| 9E3B | D9 | 0009 | | | AR | SKIP2ND# |
| 9E3C | 3D4F | 9E4F | | | BE | MOVE9A |
| 9E3E | F9 | 0009 | | | LRD | SKIP2NC# |
| 9E3F | A9D0 | 00D0 | | | | |
| 9E41 | 2C21 | 9E21 | | | B | MOVE3 |
| 9E43 | 2422 | 9F22 | | MOVEENDX | B | MOVEEND |
| 9E45 | E5 | 0005 | | MOVE9 | LR | REMAKE# |

| ADDR | INSTR | OP1 | OP2 | LABEL | MNEMONIC | INSTR |
|---|---|---|---|---|---|---|
| 9E46 | 2A | | | | S1 | |
| 9E47 | 85 | 0005 | | | STR | REMAKE# |
| | | | | | SRG | GROUPPR |
| 9E48 | A9D0 | 00D0 | | | | |
| 9E4A | 6F | 9E4F | | | JNE | MOVE9A |
| 9E4B | E7 | 0007 | | | LR | BR1 |
| 9E4C | AF10 | 0004 | | | TS | ERRCHNGF |
| 9E4E | 87 | 0007 | | | STR | BR1 |
| . . . | | | | | | |
| A8CB | E6 | 0006 | | CHAR5 | LR | PRINTINT |
| A8CC | 2E | | | | A1 | |
| A8CD | 86 | 0006 | | | STR | PRINTINT |
| | | | | | SRG | GROUPSU |
| . . . | | | | | | |
| A8EA | A619 | 0219 | | CHAR6 | LBL | BYTE3 |
| A8EC | 92 | 0002 | | | TP | CW |
| A8ED | 48 | A8FB | | | JE | CHAR7 |
| A8EE | EF | 000F | | | LR | UNITS |
| A8EF | AE09 | 0009 | | | LI | SUP |
| A8F1 | 8F | 000F | | | STR | UNITS |
| A8F2 | 9F | 000F | | | LN | UNITS |
| A8F3 | 96 | 0006 | | | TP | ECFP |
| A8F4 | 3553 | A953 | | | BE | ENDC |
| A8F6 | 2411 | A911 | | | B | CHAR8 |
| | | | | CHAR7 | LA | $IGNUMBR |
| A8F8 | AE04 | 0466 | | | | |
| A8FA | 29 | | | | | |
| A8FB | AE66 | 0466 | | | | |
| A8FD | 8F | 000F | | | STR | UNITS |
| A8FE | 9F | 000F | | | LN | UNITS |
| A8FF | 29 | | | | TRA | |
| A900 | A60F | 020F | | | LBL | UNITS+ GROUPPR*32 |
| A902 | 2E | | | | A1 | |
| A903 | A10F | 020F | | | STBL | UNITS+ GROUPPR*32 |

| ADDR | INSTR | OP1 | OP2 | LABEL | MNEMONIC INSTR | |
|---|---|---|---|---|---|---|
| A905 | AB0D | 0000 | | | CI | 0 |
| A907 | 6D | A90D | | | JNE | CHAR7A |
| A908 | A61F | 021F | | | LBL | UNITS+ |
| | | | | | | GROUPPR* |
| | | | | | | 32+16 |
| A90A | 2E | | | | A1 | |
| A90B | A11F | 021F | | | STBL | UNITS+ |
| | | | | | | GROUPPR* |
| | | | | | | 32+16 |
| A90D | 9F | 000F | | CHAR7A | LN | UNITS |
| A90E | C6 | 0006 | | | SR | PRINTINT |
| A90F | BE53 | A953 | | | BH | ENDC |
| A911 | 25 | | | CHAR8 | CLA | |
| A912 | 86 | 0006 | | | STR | PRINTINT |
| . . . | | | | | | |
| A925 | F5 | 0005 | | CHAR9 | LRB | NUMSETS |
| A926 | AB0F | 000F | | | NI | 15 |
| A928 | A80A | 000A | | | CI | 10 |
| A92A | E5 | 0005 | | | LR | NUMSETS |
| A92B | 69 | A939 | | | JNE | CHAR11 |
| A92C | AC10 | 0010 | | | A1 | 16 |
| A92E | ABF0 | 00F0 | | | NI | X'F0' |
| A930 | A8A0 | 00A0 | | | CI | X'A0' |
| A932 | 68 | A938 | | | JNE | CHAR10 |
| A933 | AB00 | 0000 | | | NI | 0 |
| A935 | 29 | | | | TRA | |
| A936 | 2E | | | | A1 | |
| A937 | 29 | | | | TRA | |
| A938 | B5 | 0005 | | CHAR10 | STR | NUMSETS |
| . . . | | | | | | |
| AC47 | EA | 0008 | | | LR | FLCNTLR |
| AC48 | 90 | 0000 | | | TP | DUPLEXLT |
| AC49 | 40 | AC4C | | | JE | BUMPEXIT |
| AC4A | 94 | 0004 | | | TP | SIDE2 |
| AC4B | 40 | AC50 | | | JE | BUMPTRAY |
| | | | | BUMPEXIT | SRG | GROUPEX2 |

| ADDR | INSTR | OP1 | OP2 | LABEL | MNEMONIC INSTR | |
|---|---|---|---|---|---|---|
| AC4C | A9D2 | 00D2 | | | | |
| AC4E | FE | 000E | | | LRB | EXIT# |
| AC4F | 05 | AC55 | | | J | BUMPNCT |
| | | | | BUMPTRAY | SRGM | GROUPPR |
| AC50 | A990 | 0090 | | BUMPTRAY | G1 | $MASKCN+GROUPPR |
| AC52 | E3 | 0003 | | | LR | TRAY# |
| AC53 | 2E | | | | A1 | *** |
| AC54 | B3 | 0003 | | | STR | TRAY# |
| | | AC55 | | BUMPNOT | DC | * |
| | | | | | SRGU | GROUPPR |
| AC55 | A910 | 0010 | | | GI | $MASKCFF+GROUPPR |
| AC57 | 25 | | | | CLA | *** |
| AC58 | DA | 000A | | | AR | LOSTPAGE |
| | | | | | SRG | GROUPCD |
| AC59 | A9D1 | 00D1 | | | | |
| AC5B | 61 | AC61 | | | JNE | CHECKCW |
| AC5C | A607 | 0207 | | | LBL | BYTE1 |
| AC5E | 95 | 0005 | | | TP | STCPPRTF |
| AC5F | 3C7C | AC7C | | | BNE | RSTEXIT |
| AC61 | A519 | 0219 | | CHECKCW | LBL | BYTE3 |
| AC63 | 92 | 0002 | | | TP | CW |
| AC64 | 3080 | AC80 | | | BNE | NCEXRST |
| | | | | CKEXITIG | LA | $IGNUMBR |
| AC66 | AE04 | 0466 | | | | |
| AC68 | 29 | | | | | |
| AC69 | AE66 | 0466 | | | | |
| AC6B | 8E | 000E | | | STR | TEMPINDR |
| AC6C | 9E | 000E | | | LN | TEMPINDR |
| AC6D | 29 | | | | TRA | *** |
| AC6E | 81 | 0001 | | | STR | BAL1 |
| AC6F | FE | 000E | | | LRB | TEMPINDR |
| AC70 | E1 | 0001 | | | LR | BAL1 |
| AC71 | 9E | 000E | | | LN | TEMPINDR |
| AC72 | 8E | 000E | | | STR | TEMPINDR |
| AC73 | E8 | 0008 | | | LR | FLCNTLR |
| AC74 | 90 | 0000 | | | TP | DUPLEXLT |

| ADDR | INSTR | OP1 | OP2 | LABEL | MNEMONIC INSTR | |
|---|---|---|---|---|---|---|
| AC75 | EE | 000E | | | LR | TEMPINDR |
| AC76 | 48 | AC78 | | | JE | EXEQ$IG |
| AC77 | 2F | | | | SHR | *** |
| | | | | EXEQ$IG | SRG | GROUPEX2 |
| AC78 | A9D2 | 00D2 | | | | |
| AC7A | CE | 000E | | | SR | EXIT# |
| AC7B | 60 | AC80 | | | JNE | NOEXRST |
| | | | | RSTEXIT | SRG | GROUPEX2 |
| AC7C | A9D2 | 00D2 | | | | |
| AC7E | 25 | | | | CLA | *** |
| AC7F | 8E | 000E | | | STR | EXIT# |
| | | AC80 | | NOEXRST | DC | * |
| | | | | | SRG | GROUPEX2 |
| AC80 | A9D2 | 00D2 | | | | |
| AC82 | 25 | | | | CLA | *** |
| AC83 | D4 | 0004 | | | AR | ACRBINE# |
| AC84 | 4E | AC8E | | | JE | CHKBLANK |
| AC85 | 2A | | | | S1 | *** |
| AC86 | 84 | 0004 | | | STR | ACRBINH# |
| | | | | | TSMBL | CPYCNTLB, |
| | | | | | | P(ACRBINHF) |
| AC87 | A628 | 0028 | | | LB | $REK074 |
| | | | | | 01 | $CA1075+ |
| | | | | | | $CA2075+ |
| | | | | | | $CA3075+ |
| | | | | | | $CA4075+ |
| | | | | | | $CA5075+ |
| | | | | | | $CA6075+ |
| | | | | | | $CA7075+ |
| AC89 | AF80 | 0080 | | | | $CA8075 |
| AC8B | A128 | 0028 | | | STB | $REK074 |
| AC8D | 0E | AC9E | | | J | SHIFTBB |
| AC8E | A642 | 0242 | | CHKBLANK | LBL | BILCNTLB |
| AC90 | 90 | 0000 | | | TP | 0 |
| AC91 | 49 | AC99 | | | JE | CKRSTBIN |

| ADDR | INSTR | OP1 | OP2 | LABEL | MNEMONIC INSTR | |
|---|---|---|---|---|---|---|
| | | | | | TSMBL | CPYCNTLB, |
| | | | | | | P(ACRBINHF) |
| AC92 | A628 | C028 | | | LB | $REK077 |
| | | | | | 01 | $CA1078+ |
| | | | | | | $CA2078+ |
| | | | | | | $CA3078+ |
| | | | | | | $CA4078+ |
| | | | | | | $CA5078+ |
| | | | | | | $CA6078+ |
| | | | | | | $CA7078+ |
| AC94 | AF80 | 0080 | | | | $CA8078 |
| AC96 | A128 | 0028 | | | STB | $REK077 |
| AC98 | 0E | AC9E | | | J | SHIFTBB |
| | | | | OKRSTBIN | TRMBL | CPYCNTLB, |
| | | | | | | P(ACRBINHF) |
| AC99 | A628 | 0028 | | OKRSTBIN | LB | $REK080 |
| AC9B | B7 | 0007 | | | TR | ACRBINHF |
| AC9C | A128 | 0028 | | | STB | $REK08C |
| AC9E | 25 | | | SHIFTBB | CLA | *** |
| AC9F | A642 | 0242 | | | LBL | BILCNTLB |
| ACA1 | 2F | | | | SHR | *** |
| ACA2 | A142 | 0242 | | | STBL | BILCNTLB |
| . . . | | | | | | |
| AD3A | 32D6BB | 0002 | BBD6 | | BAL | BAL2, |
| | | | | | | PDIPPER |
| . . . | | | | | | |
| AE59 | A991 | 0091 | | | GI | $MASKON+GROUPCD |
| AE5B | ED | 000D | | | LR | CCNTIMR |
| AE5C | B5 | 0005 | | | TR | FORCERRF |
| AE5D | 3D65 | AE65 | | | BE | PPATH1 |
| AE5F | BD | 000D | | | STR | CONTIMR |
| | | | | | SRGU | GROUPCD |
| AE60 | A911 | 0011 | | | GI | $MASKOFF+GROUPCD |
| | | | | | AIF | ('&SYSPARM' |
| | | | | | | (3,2) EQ |
| | | | | | | 'HK').AJR5 |

| ADDR | INSTR | OP1 | OP2 | LABEL | MNEMONIC INSTR | |
|---|---|---|---|---|---|---|
| | | | | .AJR5 | ANOP | |
| | | | | | AIF | ('&SYSPARM' (3,2) NE 'HK') .AJR15 |
| AE62 | 31B3BC | 0001 | BCB8 | | BAL | BAL1, PRECSMAL |
| . . . | | | | | | |
| B0BF | 31B8BC | 0001 | BCB8 | CHNGERR | BAL | BAL1, PRECSMAL |
| | | | | .AJR14 | ANOP | |
| B0C2 | 24CE | B10E | | | B | SIDEONEX |
| B0C4 | 26A1 | 00A1 | | SIDETWO | IN | $STATUS |
| B0C6 | 96 | 0006 | | | TP | CIDTF |
| B0C7 | 3DDF | B0DF | | | BE | CHNGOK |
| B0C9 | 31B4BB | 0001 | BBB4 | | BAL | BAL1, NUMSETS1 |
| | | | | | LA | $IGNUMBR |
| B0CC | AE04 | 0466 | | | | |
| B0CE | 29 | | | | | |
| B0CF | AE66 | 0466 | | | | |
| B0D1 | 8E | 000E | | | STR | TEMPINDR |
| B0D2 | 9E | 000E | | | LN | TEMPINDR |
| B0D3 | 29 | | | | TRA | *** |
| B0D4 | B1 | 0001 | | | STR | BAL1 |
| B0D5 | FE | 000F | | | LRB | TEMPINDR |
| B0D6 | E1 | 0001 | | | LR | BAL1 |
| B0D7 | 9E | 00DE | | | LN | TEMPINDR |
| | | | | | SRG | GROUPPR |
| B0D8 | A9D0 | 00D0 | | | | |
| B0DA | 86 | 0006 | | | STR | PRINTINT |
| | | | | | SRG | GROUPCD |
| B0DB | A9D1 | 00D1 | | | | |
| B0DD | 2CBF | | | | B | CHNGERR |
| . . . | | | | | | |

| ADDR | INSTR | OP1 | OP2 | LABEL | MNEMONIC INSTR |
|---|---|---|---|---|---|
| B64B | A609 | 0209 | | | LBL BYTE2 |
| B64D | 94 | 0004 | | | TP PRINTD |
| B64E | B093 | B693 | | | BE CISMPLX |
| B650 | 26A1 | 00A1 | | | IN $STATUS |
| B652 | 96 | 0006 | | | TP CIDTF |
| B653 | BC85 | B685 | | | BNE INTWAIT1 |
| B655 | A619 | 0219 | | | LBL BYTE3 |
| B657 | AB06 | 0006 | | | N1 P(CW,CR) |
| B659 | B085 | B685 | | | BE INTWAIT1 |
| B65B | A607 | 0207 | | | LBL BYTE1 |
| B65D | 95 | 0005 | | | TP STCPPRTF |
| B65E | BC85 | B685 | | | BNE INTWAIT1 |
| B660 | A619 | 0219 | | | LBL BYTE3 |
| B662 | 92 | 0002 | | | TP CW |
| B663 | B080 | B680 | | | BE COPY INTD |
| B665 | 84 | 0004 | | | TR P |
| B666 | BD80 | B680 | | | BE COPY INTD |
| B668 | A119 | 0219 | | | STBL BYTE3 |
| | | | | | SRG GROUPEX2 |
| B66A | A9D2 | 00D2 | | | |
| B66C | 25 | | | | CLA *** |
| B66D | 83 | 0003 | | | STR SKIP1ST# |
| B66E | 8E | 000F | | | LR EXIT# |
| B66F | 2B | | | | SHL *** |
| B670 | 89 | 0009 | | | STR SKIP2ND# |
| | | | | | SRGM GROUPPR |
| B671 | A990 | 0090 | | | GI $MASKCN+ GROUPPR |
| B673 | 86 | 0006 | | | STR PRINTINT |
| . . . | | | | | |
| BA7F | E8 | 0008 | | | LR FLCNTLR |
| BA80 | 94 | 0004 | | | TP SIDE2 |
| BA81 | BD95 | BA95 | | | BE INIT2 |
| BA83 | 26A1 | 00A1 | | | IN $STATUS |
| BA85 | 96 | 0006 | | | TP CIDTF |

| ADDR | INSTR | OP1 | OP2 | LABEL | MNEMONIC INSTR |
|---|---|---|---|---|---|
| BA86 | 65 | BA95 | | | JNE INIT2 |
| | | | | | SRGM GROUPCD |
| BA87 | A991 | 0091 | | | GI $MASKON+ GROUPCD |
| | | | | | TSMR CONTIMR, P(FORCERRF) |
| BA89 | ED | 000D | | | |
| BA8A | AF20 | 0020 | | | |
| BA8C | BD | 000D | | | |
| | | | | | SRGU GROUPCD |
| BA8D | A911 | 0011 | | | CI $MASKOFF+ GROUPCD |
| BA8F | AE04 | 0004 | | | LI CALSCON |
| BA91 | 2779 | 0079 | | | OUT $DEVML79 |
| BA93 | 2CE8 | BAE8 | | | B INITEND |
| | | BA95 | | INIT2 | DC * |
| BA95 | EC | 000C | | | LR SOFTJOBR |
| BA96 | AF04 | 0002 | | | TS $INITREQ |
| BA98 | A12C | 022C | | | STBL $JOBFLGB |
| | | | | | AIF ('&SYSPARM' (3,2) NE 'HK') .AJR12 |
| BA9A | A652 | 0252 | | | LBL AJRBYTE |
| BA9C | B0 | 0000 | | | TR BLNKPGF |
| BA9D | 3DD6 | BAD6 | | | BE INITBEND |
| BA9F | A152 | 0252 | | | STBL AJRBYTE |
| | | | | | SRG GROUPPR |
| BAA1 | A9D0 | 00D0 | | | |
| BAA3 | 25 | | | | CLA *** |
| BAA4 | DA | 000A | | | AR LOSTPAGE |
| BAA5 | 3DB9 | BAB9 | | | BE SETBINHF |
| BAA7 | 2A | | | | SI *** |
| BAA8 | BDC1 | BAC1 | | | BE SETBINH0 |
| BAAA | 2A | | | | SI *** |
| BAAB | BDC6 | BAC6 | | | BE SETBINH1 |

| ADDR | INSTR | OP1 | OP2 | LABEL | MNEMONIC INSTR | |
|---|---|---|---|---|---|---|
| BAAD | 2A | | | | SI | *** |
| BAAE | 3DCB | BACB | | | BE | SETBINH2 |
| BAB0 | 2A | | | | SI | *** |
| BAB1 | 3DD0 | BAD0 | | | BE | SETBINH3 |
| BAB3 | A642 | 0242 | | | LBL | BILCNTLB |
| BAB5 | AF10 | 0004 | | | TS | 4 |
| BAB7 | 2CD4 | BAD4 | | | B | INITBIND |
| | | | | SETBINHF | TSMBL | CPYCNTLB, P(ACRBINHF) |
| BAB9 | A628 | 0028 | | SETBINHF | LB | $REK837 |
| | | | | | 01 | $CA1838+ |
| | | | | | | $CA2838+ |
| | | | | | | $CA3838+ |
| | | | | | | $CA4838+ |
| | | | | | | $CA5838+ |
| | | | | | | $CA6838+ |
| | | | | | | $CA7838+ |
| BABB | AF80 | 0080 | | | | $CA8838 |
| BABD | A128 | 0028 | | | STB | $REK837 |
| BABF | 2CD6 | BAD6 | | | B | INITBEND |
| BAC1 | A642 | 0242 | | SETBINH0 | LBL | BILCNTLB |
| BAC3 | AF01 | 0000 | | | TS | 0 |
| BAC5 | 04 | BAD4 | | | J | INITBIND |
| BAC6 | A642 | 0242 | | SETBINH1 | LBL | BILCNTLB |
| BAC8 | AF02 | 0001 | | | TS | 1 |
| BACA | 04 | BAD4 | | | J | INITBIND |
| BACB | A642 | 0242 | | SETBINH2 | LBL | BILCNTLB |
| BACD | AF04 | 0002 | | | TS | 2 |
| BACF | 04 | BAD4 | | | J | INITBIND |
| BAD0 | A642 | 0242 | | SETBINH3 | LBL | BILCNTLB |
| BAD2 | AF03 | 0003 | | | TS | 3 |
| BAD4 | A142 | 0242 | | INITBIND | STBL | BILCNTLB |
| | | | | INITBEND | SRG | GROUPCD |

| ADDR | INSTR | OP1 | OP2 | LABEL | MNEMONIC INSTR |
|---|---|---|---|---|---|
| BAD6 | A9D1 | 00D1 | | | |
| . . . | | | | | |
| | | | | | SRGM GROUPEX2 |
| BB0F | A992 | 0092 | | | GI $MASKON+ GROUPEX2 |
| BB11 | 25 | | | | CLA *** |
| BB12 | D4 | 0004 | | | AR ACRBINH# |
| BB13 | 4C | BB1C | | | JE ACTBKBL |
| BB14 | 2A | | | | SI *** |
| BB15 | 84 | 0004 | | | STR ACRBINH# |
| | | | | | SRG GROUPCD |
| BB16 | A9D1 | 00D1 | | | |
| | | | | | TSMR FLCNTLR, P(ACRBINHF) |
| BB18 | E8 | 0008 | | | |
| BB19 | AF80 | 0080 | | | |
| BB1B | 88 | 0008 | | | |
| . . . | | | | | |
| | | | | | SRGM GROUPPR |
| BBF6 | A990 | 0090 | | | GI $MASKON+ GROUPPR |
| BBF8 | A619 | 0219 | | | LBL BYTE3 |
| BBFA | 92 | 0002 | | | TP CW |
| BBFB | B52F | BC2F | | | BE TWOTHRUN |
| BBFD | B4 | 0004 | | | TR P |
| BBFE | A119 | 0219 | | | STBL BYTE3 |
| BC00 | E9 | 0009 | | | LR BR2 |
| BC01 | 94 | 0004 | | | TP PRINTD |
| BC02 | B022 | BC22 | | | BE PCWSIMP |
| | | | | | SRGU GROUPCD |
| BC04 | A911 | 0011 | | | GI $MASKOFF+ GROUPCD |
| BC06 | 26A1 | 00A1 | | | IN $STATUS |
| BC08 | 96 | 0006 | | | TP CIDTF |
| BC09 | 47 | BC17 | | | JE NOCMPRQD |

| ADDR | INSTR | OP1 | OP2 | LABEL | MNEMONIC INSTR | |
|---|---|---|---|---|---|---|
| BC0A | 91 | 0001 | | | TP | NOTREADY |
| BC0B | 40 | BC10 | | | JE | DUMP |
| | | | | | TRMR | STATER, |
| | | | | | | P(DODIPF) |
| BC0C | EF | 000F | | | | |
| BC0D | B7 | 0007 | | | | |
| BC0E | BF | 000F | | | | |
| BC0F | 07 | BC17 | | | J | NODMPRQD |
| BC10 | 31818B | 0001 | BB81 | DUMP | BAL | BAL1,DDPTS |
| | | | | | TSMR | FLONTLR, |
| | | | | | | P(ACRBINHF) |
| BC13 | E8 | 0008 | | | | |
| BC14 | AF80 | 0080 | | | | |
| BC16 | B8 | 0008 | | | | |
| | | | | NODMPRQD | SRG | GROUPEX2 |
| BC17 | A9D2 | 00D2 | | | | |
| BC19 | 25 | | | | CLA | *** |
| BC1A | 83 | 0003 | | | STR | SKIP1ST# |
| BC1B | BE | 000E | | | LR | EXIT# |
| BC1C | 2B | | | | SHL | *** |
| BC1D | 89 | 0009 | | | STR | SKIP2ND# |
| | | | | | SRG | GROUPPR |
| BC1E | A9D0 | 00D0 | | | | |
| BC20 | 86 | 0006 | | | STR | PRINTINT |
| . . . | | | | | | |
| BC3E | A9D0 | 00D0 | | | | |
| BC40 | 25 | | | | CLA | *** |
| BC41 | D6 | 00D6 | | | AR | PRINTINT |
| | | | | | SRG | GROUPCD |
| BC42 | A9D1 | 00D1 | | | | |
| BC44 | B8 | BC48 | | | JNE | NODECSET |
| BC45 | 31B4BB | 0001 | BBB4 | | BAL | BAL1, |
| | | | | | | NUMSETS1 |
| | | BC48 | | NODECSET | DC | * |
| | | | | | SRG | GROUPPR |

| ADDR | INSTR | OP1 | OP2 | LABEL | MNEMONIC INSTR | |
|---|---|---|---|---|---|---|
| BC48 | A9D0 | 0000 | | | | |
| BC4A | E3 | 0003 | | | LR | TRAY# |
| | | | | | SRG | GROUPEX2 |
| BC4B | A9D2 | 00D2 | | | | |
| BC4D | B3 | 0003 | | | STR | SKIP1ST# |
| BC4E | EE | 00DE | | | LR | EXIT# |
| BC4F | 2B | | | | SHL | *** |
| BC50 | 89 | 0009 | | | STR | SKIP2ND# |
| | | | | | SRG | GROUPPR |
| BC51 | A9D0 | 00D0 | | | | |
| BC53 | 03 | 0003 | | | AR | TRAY# |
| BC54 | 86 | 0006 | | | STR | PRINTINT |
| BC55 | A628 | 0228 | | | LBL | CPYCNTLB |
| BC57 | 94 | 0004 | | | TP | SIDE2 |
| BC58 | 48 | BC68 | | | JE | PEREX |
| BC59 | EA | 000A | | | LR | LOSTPAGE |
| | | | | | SRG | GROUPEX2 |
| BC5A | A9D2 | 00D2 | | | | |
| BC5C | D4 | 00D4 | | | AR | ACRBINH# |
| BC5D | B4 | 0004 | | | STR | ACRBINH# |
| BC5E | A628 | 0228 | | | LBL | CPYCNTLB |
| BC60 | AF80 | 0007 | | | TS | ACRBINHF |
| BC62 | 68 | BC68 | | | JNE | NODECST1 |
| BC63 | A128 | 0228 | | | STBL | CPYCNTLB |
| BC65 | E4 | 0004 | | | LR | ACRBINH# |
| BC66 | 2A | | | | S1 | *** |
| BC67 | 84 | 0004 | | | STR | ACRBINH# |
| | | BC68 | | NODECST1 | DC | * |
| | | | | PEREX | SRG | GROUPCD |
| BC68 | A9D1 | 00D1 | | | | |
| BC6A | 2CA3 | BCA3 | | | B | PERE |
| . . . | | | | | | |
| | | | | PRECSMAL | SRGM | GROUPPR |
| BCB8 | A990 | 0090 | | PRECSMAL | GI | $MASKON+ |
| | | | | | | GROUPPR |

| ADDR | INSTR | OP1 | OP2 | LABEL | MNEMONIC INSTR | |
|---|---|---|---|---|---|---|
| BCBA | 25 | | | | CLA | *** |
| BCBB | 83 | 0003 | | | STR | TRAY# |
| BCBC | E6 | 0006 | | | LR | PRINTINT |
| | | | | | SRGU | GROUPEX2 |
| BCBD | A912 | 0012 | | | GI | $MASKOFF+ GROUPEX2 |
| BCBF | D4 | 0004 | | | AR | ACRBINH# |
| BCC0 | B4 | 0004 | | | STR | ACRBINH# |
| BCC1 | A628 | 0228 | | | LBL | CPYCNTLB |
| BCC3 | AF80 | 0007 | | | TS | ACRBINHF |
| BCC5 | 6B | BCCB | | | JNE | NODECST2 |
| BCC6 | A128 | 0228 | | | STBL | CPYCNTLB |
| BCC8 | E4 | 0004 | | | LR | ACRBINH# |
| BCC9 | 2A | | | | SI | *** |
| BCCA | 84 | 0004 | | | STR | ACRBINH# |
| | | BCCB | | NODECST2 | DC | * |
| BCCB | 25 | | | | CLA | *** |
| BCCC | 83 | 0003 | | | STR | SKIP1ST# |
| BCCD | 85 | 0005 | | | STR | REMAKE# |
| BCCE | 89 | 0009 | | | STR | SKIP2ND# |
| BCCF | BE | 000E | | | STR | EXIT# |
| | | | | | SRGM | GROUPPR |
| BCD0 | A990 | 0090 | | | GI | $MASKON+ GROUPPR |
| BCD2 | B6 | 0006 | | | STR | PRINTINT |
| BCD3 | A142 | 0242 | | | STBL | BILCNTLB |
| | | | | | TRMBL | AJRBYTE, P(BLNKPGE) |
| BCD5 | A652 | 0052 | | | LB | $REK912 |
| BCD7 | B0 | 0000 | | | TR | BLNKPGE |
| BCD8 | A152 | 0052 | | | STB | $REK912 |
| . . . | | | | | | |
| BDE5 | E8 | 0008 | | | LR | FLONTLR |
| BDE6 | B7 | 0007 | | | TR | ACRBINHF |
| BDE7 | 88 | 0008 | | | STR | FLONTLR |

| ADDR | INSTR | OP1 | OP2 | LABEL | MNEMONIC INSTR | |
|---|---|---|---|---|---|---|
| BDE8 | 4E | BDEE | | | JE | NEXTTIME |
| BDE9 | A9D2 | 00D2 | | | | |
| BDEB | F4 | 0004 | | | LRB | ACFBINH# |
| | | | | | SRG | GROUPCD |
| BDEC | A9D1 | 00D1 | | | | |

Signed and Sealed this

*Eighth* Day of *June 1982*

|SEAL|

*Attest:*

GERALD J. MOSSINGHOFF

*Attesting Officer* *Commissioner of Patents and Trademarks*